United States Patent

Ma et al.

[11] Patent Number: 5,953,338
[45] Date of Patent: Sep. 14, 1999

[54] DYNAMIC CONTROL PROCESSES AND SYSTEMS FOR ASYNCHRONOUS TRANSFER MODE NETWORKS

[75] Inventors: Patrick S. Ma, Plano; Gregory S. Graham, Garland, both of Tex.

[73] Assignee: Northern Telecom Limited, Montreal, Canada

[21] Appl. No.: 08/764,959

[22] Filed: Dec. 13, 1996

[51] Int. Cl.[6] .............................. H04L 12/28; H04L 12/56
[52] U.S. Cl. .......................... 370/395; 370/377; 370/400
[58] Field of Search .................................. 370/229–235, 370/237, 248, 252, 253, 389, 395, 396, 372, 400, 401, 404, 406, 408, 468, 250, 397, 412, 405, 409, 419, 465, 474, 384, 388, 377

[56] References Cited

U.S. PATENT DOCUMENTS

| | | | |
|---|---|---|---|
| 5,267,232 | 11/1993 | Katsube et al. | 370/230 |
| 5,282,207 | 1/1994 | Jurkevich et al. | 370/468 |
| 5,315,586 | 5/1994 | Charvillat | 370/232 |
| 5,519,689 | 5/1996 | Kim | 370/232 |
| 5,521,971 | 5/1996 | Key et al. | 370/233 |
| 5,557,611 | 9/1996 | Cappellari et al. | 370/395 |
| 5,623,492 | 4/1997 | Teraslinna | 370/468 |
| 5,633,868 | 5/1997 | Baldwin et al. | 370/331 |
| 5,689,499 | 11/1997 | Hullett et al. | 370/235 |
| 5,696,764 | 12/1997 | Soumiya et al. | 370/395 |
| 5,734,656 | 3/1998 | Prince et al. | 370/401 |
| 5,818,842 | 10/1998 | Burwell et al. | 370/412 |

*Primary Examiner*—Dang Ton
*Assistant Examiner*—Phirin Sam
*Attorney, Agent, or Firm*—R. Darryl Burke; McKool Smith

[57] ABSTRACT

A system comprises a system control module and a plurality of interconnected asynchronous transfer mode switches the interconnected asynchronous transfer mode switches are interconnected with one another via at least one physical interface to form a network. The network is used to transfer various types of information. Each asynchronous transfer mode switch has a connection admission control module to determine whether a virtual connection, such a virtual path, virtual channel, or grouping of virtual paths, can be connected through that particular asynchronous transfer mode switch. The virtual connection is formed from one asynchronous transfer mode switch to at least one other asynchronous transfer mode switch via a link of the at least one physical interface. The system control module connects to at least one asynchronous transfer mode switch and determines whether the virtual connection can be created in the network. A process of monitoring a utilization level of a grouping of a virtual path on a physical interface comprises checking the utilization level of the virtual path, updating an amount of available bandwidth for the virtual path, and comparing the amount of available bandwidth with a maximum threshold for the available bandwidth and setting an overload condition if the amount exceeds the maximum threshold and clearing the overload condition if the amount is below the maximum threshold. Service contracts governing a client's use of the network and ability to set up a virtual connection are also be checked in certain circumstances.

60 Claims, 13 Drawing Sheets

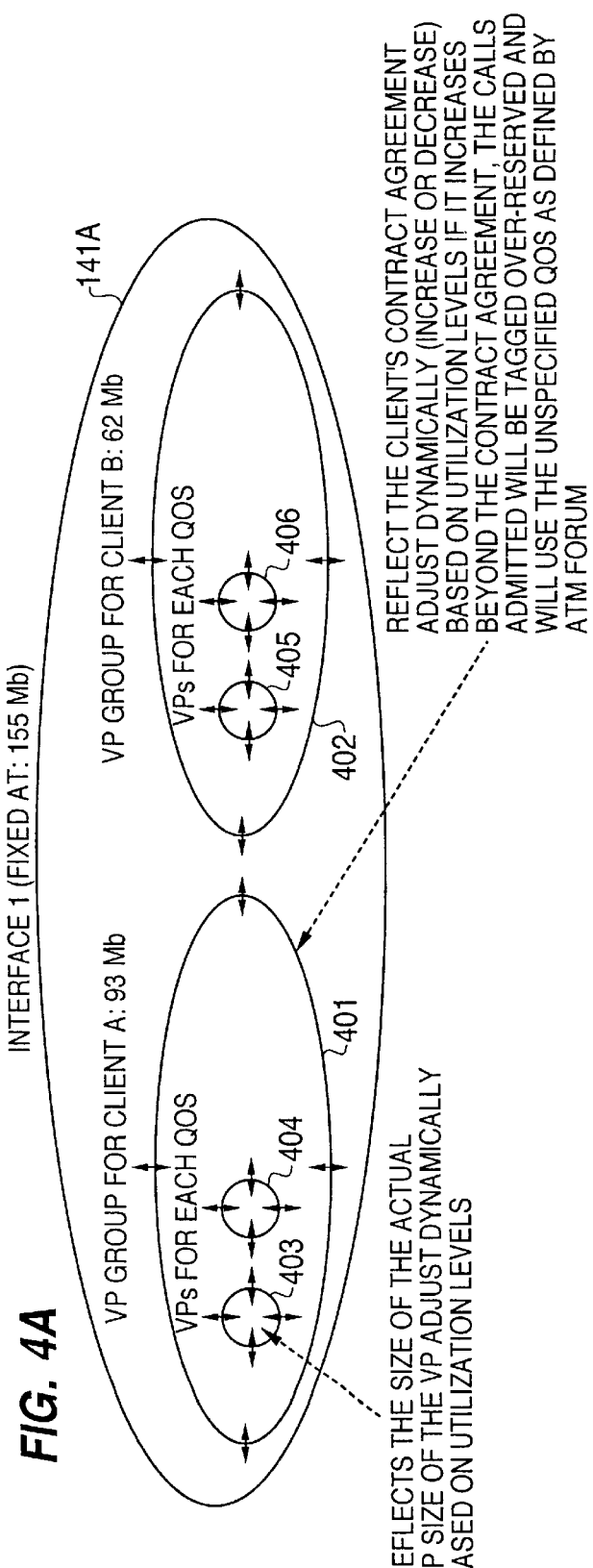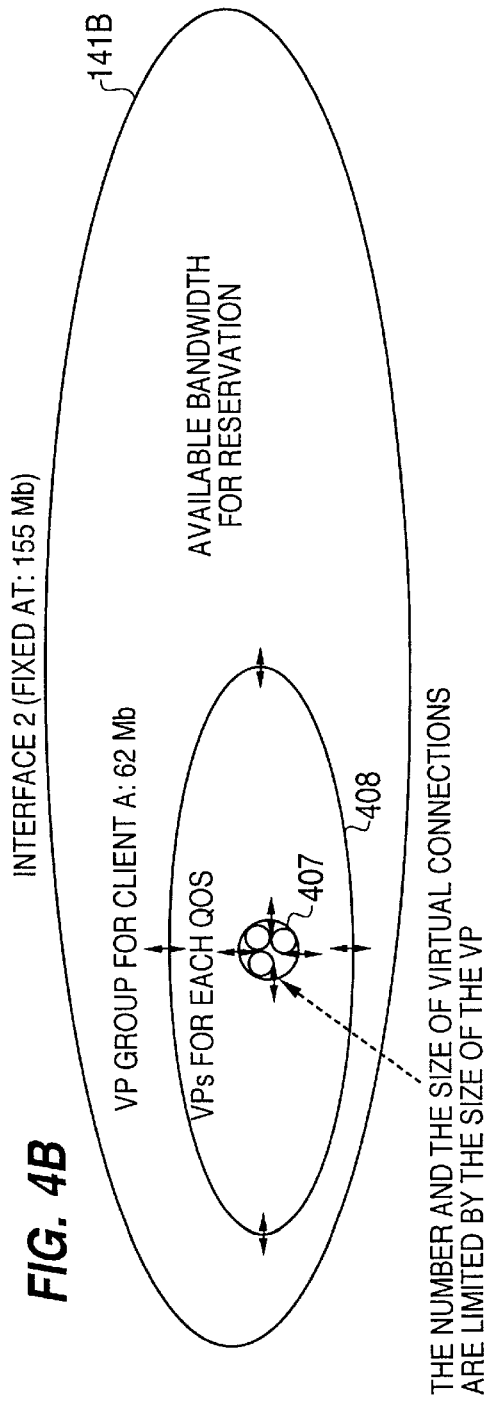

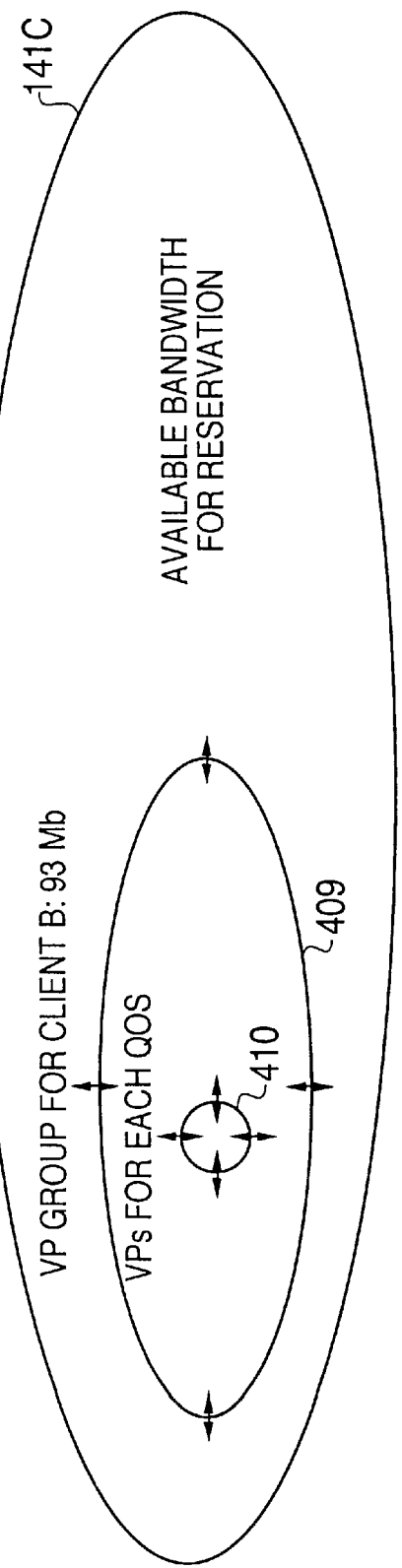
FIG. 4C
FIG. 4D

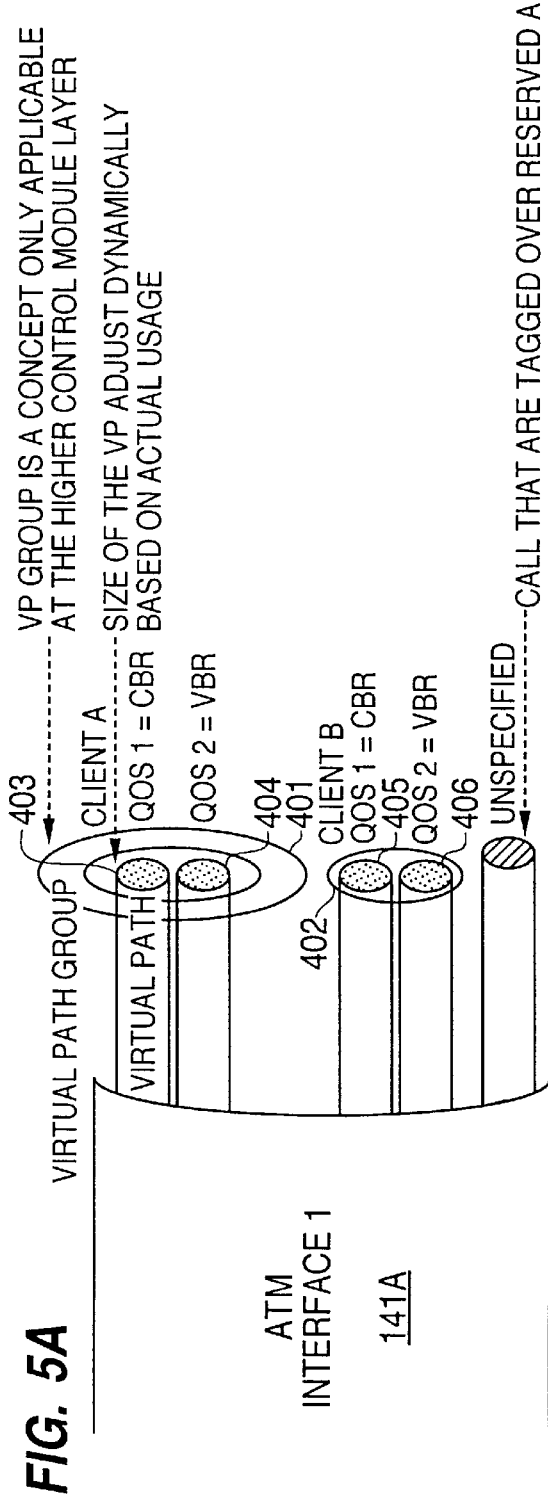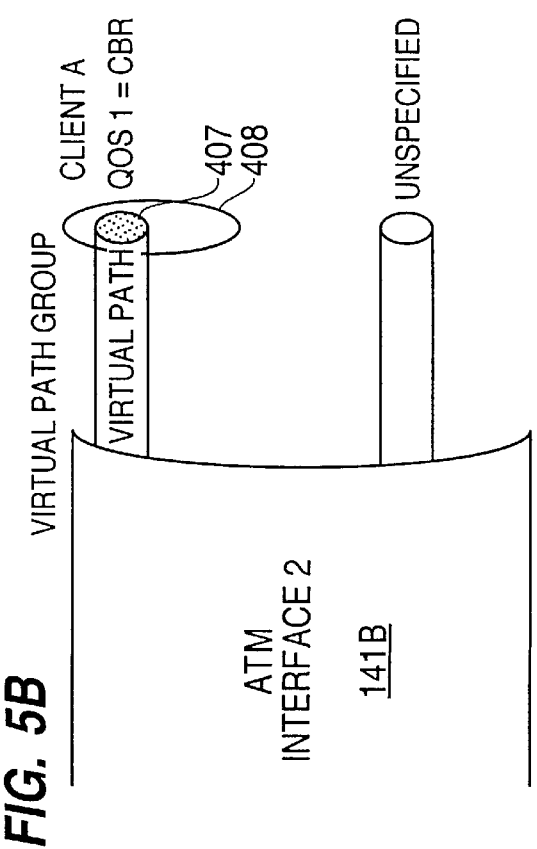
FIG. 5A
FIG. 5B

DYNAMIC CONTROL PROCESSES AND SYSTEMS FOR ASYNCHRONOUS TRANSFER MODE NETWORKS

CROSS-REFERENCE TO RELATED APPLICATIONS

The following patent applications, which are filed herewith, are incorporated by reference:

| Reference Number/ Serial Number | Title | Author |
|---|---|---|
| RR-1134 | Bandwidth Management Processes and Systems for Asynchronous Transfer Mode Networks Using Variable Virtual Paths | Greg Graham and Kim Holmes |
| RR-1135 | Enhanced Services for ATM Switching Using External Control | Greg Graham and Kim Holmes |

FIELD OF INVENTION

The present invention generally relates to the field of telecommunications equipment and processes and, more specifically, to the field of Asynchronous Transfer Mode ("ATM") network management and control equipment and processes.

BACKGROUND

Modern telecommunications systems and networks are generally built around digital networks that were originally designed for transmitting telephone conversations. These systems and networks typically use digital techniques to multiplex many communication channels designed to carry voice transmissions onto individual transmission facilities (e.g., copper wire, coaxial cable, and optical fiber). One such digital technique, Time Division Multiplex ("TDM"), divides the data transmission bandwidth of the transmission facility into equal sized time slots, which have the exact size needed to carry a telephone voice conversation. TDM generally served its purpose when the network was primarily used for standard, telephony voice transmission, but today telecommunications networks are being used to transmit computer data, video information, and voice information from cellular and traditional telephones alike. Each of these applications have varying data transmission bandwidth requirements that differ from each other and from requirements associated with traditional telephony. As a result, traditional digital techniques, such as TDM, have encountered a number of problems in recent years.

Asynchronous Transfer Mode ("ATM") techniques have provided a new way of dividing the bandwidth of the transmission facilities, physical interfaces, and switches of a network. Where TDM uses time slots to divide the bandwidth into fixed size channels, ATM uses 53 byte cells to divide the bandwidth into virtual channels. Each cell includes a header that identifies a virtual path and virtual channel to which the cell belongs. Cells can be allocated to a virtual channel in response to the needs of the users sending information over the virtual channel and the limits of the transmission facilities, physical interfaces, and switches that carry the virtual channel. Virtual paths are used to group certain virtual channels together to aid in the management and routing of the virtual channels.

To create a virtual path through an ATM network, virtual path connections must be made through each switch that the virtual path traverses, connects, or through which the virtual path connection extends. Similarly, to create a virtual channel through an ATM network, virtual channel connections must be constructed through each switch that the virtual channel traverses, connects, or through which the virtual channel extends. Virtual channel connections can be made through provisioning by the operator, which is called a Permanent Virtual Connection ("PVC"). Alternatively, virtual channel connections can be made through the use of signaling messages to request a connection, which is called a Switched Virtual Connection ("SVC").

A request for either a virtual path connection or a virtual channel connection, whether it is a PVC or SVC, typically includes the quality of service and traffic parameters that characterize the connection. The parameter corresponding to the quality of service indicates whether the requestor of the connection requires any guarantees from the network to transport data over the connection at a certain rate, which is described by the traffic parameter corresponding to the traffic. Parameters corresponding to traffic include features, such as peak cell rate, average cell rate, and cell delay variation. Parameters corresponding to traffic generally describe the network bandwidth that will be taken up by the connection.

When a request is made to set up a virtual channel connection through an ATM switch, software found in the ATM switch determines if the ATM switch and physical interfaces through which the connection is to be made can support the requested bandwidth, which is generally called Connection Admission Control ("CAC"). When a virtual channel connection is requested, it must be placed in a virtual path, so that the CAC software can determine if there is enough bandwidth remaining in the virtual path to support the new virtual channel connection. Since virtual channel connections can only be made over existing virtual paths, virtual paths provide a way to control the maximum bandwidth taken up by virtual channels in the network and, as a result, are helpful in managing the bandwidth in an ATM network. However, because virtual paths are manually provisioned in a switch, the management capabilities that they provide are inflexible and static.

In addition, large private communications networks can span a vast geographic area. In practice, it is cost prohibitive for private networks to install its own transmission facilities between different sites. Instead, private networks often lease dedicated transmission lines from a public carrier (e.g., AT&T or MCI). As a general rule, these leased lines are "nailed up" and are designed to provide full transmission capacity 24 hours a day regardless of its actual utilization. A large mesh of leased lines is typically required to provide connections between every site of a network. Furthermore, each private network will require its own mesh of leased lines. Private networks using leased lines are very expensive, because of the inefficient use of resources. Public carriers have attempted to solve this problem by allowing multiple clients to utilize the carrier's facilities and through software control have them appear as individual dedicated leased lines. This software controlled utilization then forms what has been called a Virtual Private Network ("VPN"). In order for a VPN network to function, it must effectively divide the bandwidth between different customers. Unfortunately, however, existing systems do not adequately address the concern of whether each client consumes an appropriate, necessary portion of the shared resources. There does not presently exist any way to dynamically manage stored resources on a continuous, ongoing, real-time basis.

Existing designs and procedures have other problems as well.

SUMMARY

Preferred embodiments pertain to an apparatus and related methods and systems that generally manage networks and individually and collectively manage ATM switches. Note that preferred methods are preferably performed by the preferred apparatus and systems and are discussed in reference to the preferred apparatus and systems.

Preferred embodiments of the network are generally comprised of at least one virtual private network, which is provided by a service provider. The virtual private network is comprised of a plurality of ATM switches that are interconnected with one another via one or more physical interfaces (e.g., fiber optic, twisted pair, coax, and wireless) to form the backbone of a network, which can span over a large geographical area. Clients using the virtual path network generally have a local private network of one type or another, such as a local private data network and/or a local private voice network. Sometimes, a client's local private network(s) is(are) interconnected to a carrier's network backbone via a common communication infrastructure provided by the service provider. If so, a client's local private network shares transmission facilities with other networks. Virtual connections (e.g., virtual paths, virtual channels, groupings of virtual paths, and any combination thereof) extend from one ATM switch to another ATM switch through the network and are used to transfer various types of information across the network. Preferred embodiments bundle virtual channel(s) into a virtual path and virtual paths into grouping(s) of virtual paths.

Preferred embodiments have a system-wide, centralized control module to manage these virtual paths and/or virtual channels. The control module is in direct communication with at least one ATM switch in the ATM network and in indirect communication with most, if not all, of the other ATM switches in the ATM network. The control module controls the provisioning of each ATM switch in the ATM network, which, among other things, enables the centralized control module to set up and dynamically change virtual paths and virtual channels as well as groups of virtual paths in an ATM network on an ongoing, continuous, real-time basis. The control module specifically has the ability to dynamically control the assigned parameters (e.g., bandwidth) of virtual paths, virtual channels, and groupings of virtual paths.

Specifically, regarding the operation of the control module, the control module considers one or more factors to determine whether the virtual connection through the network can be made. These factors include, but are not limited to, terms and conditions of a network contract agreement covering the virtual connection, type of information that the virtual connection will transfer (e.g., constant bit rate information, voice information, video information, variable bit rate information, data information, connection-oriented information, frame-relay information, and connectionless information), the quality of service expected of the virtual connection, existing traffic load of the network, and the utilization of the network. In particular, regarding the utilization level, the control module determines on an ongoing basis whether the network is in an overload condition. The control module also checks the overload condition and determines whether the virtual connection can be set up for the network. Similarly, the reference to a client agreement concerning the client's use of the network defines acceptable parameter and quality of service requests for the virtual connection that are available to the client. Preferred embodiments of the control module generally perform the following procedure: (i) checks with the agreement to determine whether the parameter requirements of the virtual connections are compliant with the agreement, (ii) checks with the agreement governing quality of service requests to determine whether the quality of service requirements of the virtual connections are compliant with the agreement, and (iii) determines whether the virtual connection has any available capacity. If the network is not in an overload condition and the control module does not otherwise allow (or object to) the creation of the virtual connection, the control module may allow the virtual connection to be set up in unspecified capacity of the network.

Preferred embodiments provide a number of advantages. Preferred embodiments manage an ATM switch dynamically and continuously, which allows for greater use of the available capacity of networks and, particularly, transmission facilities within a network. Preferred embodiments enable telecommunications companies that operate various types of networks for a multitude of clients to "lease" unspecified capacity on virtual paths in a virtual path group having certain features or parameters to other customers on an ATM backbone network, on an 'as needed' basis. Some of this capacity may, in fact, be owned by another party or already be leased to another party, but is not being used at the specific time that another party requests permission to use the capacity. Preferred embodiments thereby provide a technique of "throttling" the physical interfaces needed to shape the bandwidth consumed by the overall ATM networks. The importance of this capability should not be underestimated, as it effectively allows carriers to "over book" physical interfaces and transmission facilities (e.g., ATM links, ATM switches, and ATM networks) to ensure existing capacity will be used to the fullest extent possible.

Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIGS. 4A, 4B, 4C, and 4D are diagrams that illustrate the relationship between the reserved and available bandwidth for specific ATM physical interfaces 141A, 141B, 141C, and 141D (in FIG. 1A) in which virtual paths are grouped or pooled together for Clients A and B by a number of factors, such as Quality of Service ("QOS") and bandwidth;

FIGS. 5A, 5B, 5C, and 5D are diagrams that show a switch level view of specific ATM physical interfaces 141A, 141B, 141C, and 141D (in FIG. 1A) in which virtual paths are grouped or pooled together for Clients A and B by a number of factors, such as quality of service and bandwidth;

DETAILED DESCRIPTION

Figure 1A:
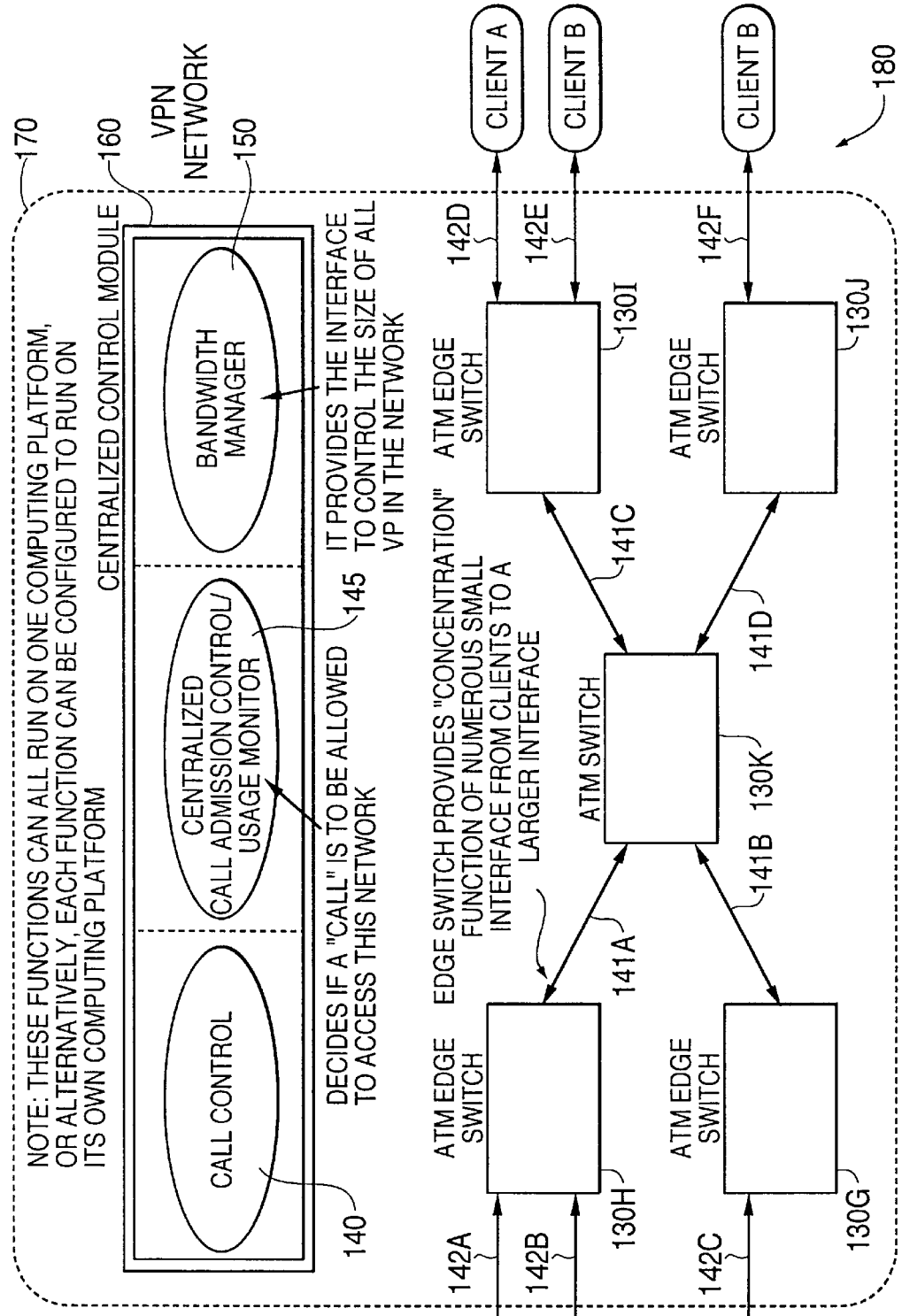
FIG. 1A is a diagram showing a preferred embodiment 180 of a virtual private network 170 having centralized control module 160 comprised of call control module 140, centralized call admission control/usage monitor module 145, and bandwidth manager module 150, ATM Edge Switch 130G, ATM Edge Switch 130H, ATM Edge Switch 130I, ATM Edge Switch 130J, and ATM Switch 130K.

The present inventions will be described by referring to apparatus and methods showing various examples of how the inventions can be made and used. When possible, like reference characters are used throughout the several views of the drawing to indicate like or corresponding parts.

FIG. 1A shows a preferred embodiment 180. Virtual private network 170 is comprised of centralized control module 160 and ATM Edge Switches 130G, 130H, 130I, and 130J and ATM Switch 130K ATM Switch 130K forms the backbone of virtual private network 170, whereas ATM Edge Switches 130G, 130H, 130I, and 130J have the additional interfaces needed to interact with various Clients A and B in order to concentrate these numerous small physical interfaces 142A, 142B, 142C, . . . , and 142F from clients into larger physical interfaces 141A, 141B, 141C, and 141D. Centralized control module 160 manages calls for virtual private network 170 and is generally comprised of call control module 140, centralized call admission control/usage monitor module 145, and bandwidth manager module 150.

In general, call control module 140 handles the majority, if not all, of the call requests for virtual private network 170. Centralized call admission control/usage monitor module 145 determines whether or not to allow a specific 'call' to access to virtual private network 170. Bandwidth manager module 150 controls the size of all virtual paths in virtual private network 170 in response to and in conjunction with call control module 140 and centralized call admission control/usage monitor module 145. Note call control module 140, centralized call admission control/usage monitor module 145, and bandwidth manager module 150 preferably all run on a single computing platform (e.g., a computer), but, alternatively, may be configured to run on more than one separate computer platform at multiple locations. Also, note that a virtual private network may stretch across large geographic distances. For instance, ATM Edge Switches 130H and 130G may reside in Richardson, Tex., whereas ATM Edge Switches 130I and 130J may reside in Raleigh, N.C. And, ATM Switch 130K may reside somewhere else, such as in Knoxville, Tenn. Centralized control module 160 may be positioned in one or more places as well. For the purposes of illustration, all of the transmission facilities or physical interfaces shown in the figures are presumed to be OC-3 interfaces, but other physical interfaces can be used.

Figure 1B:
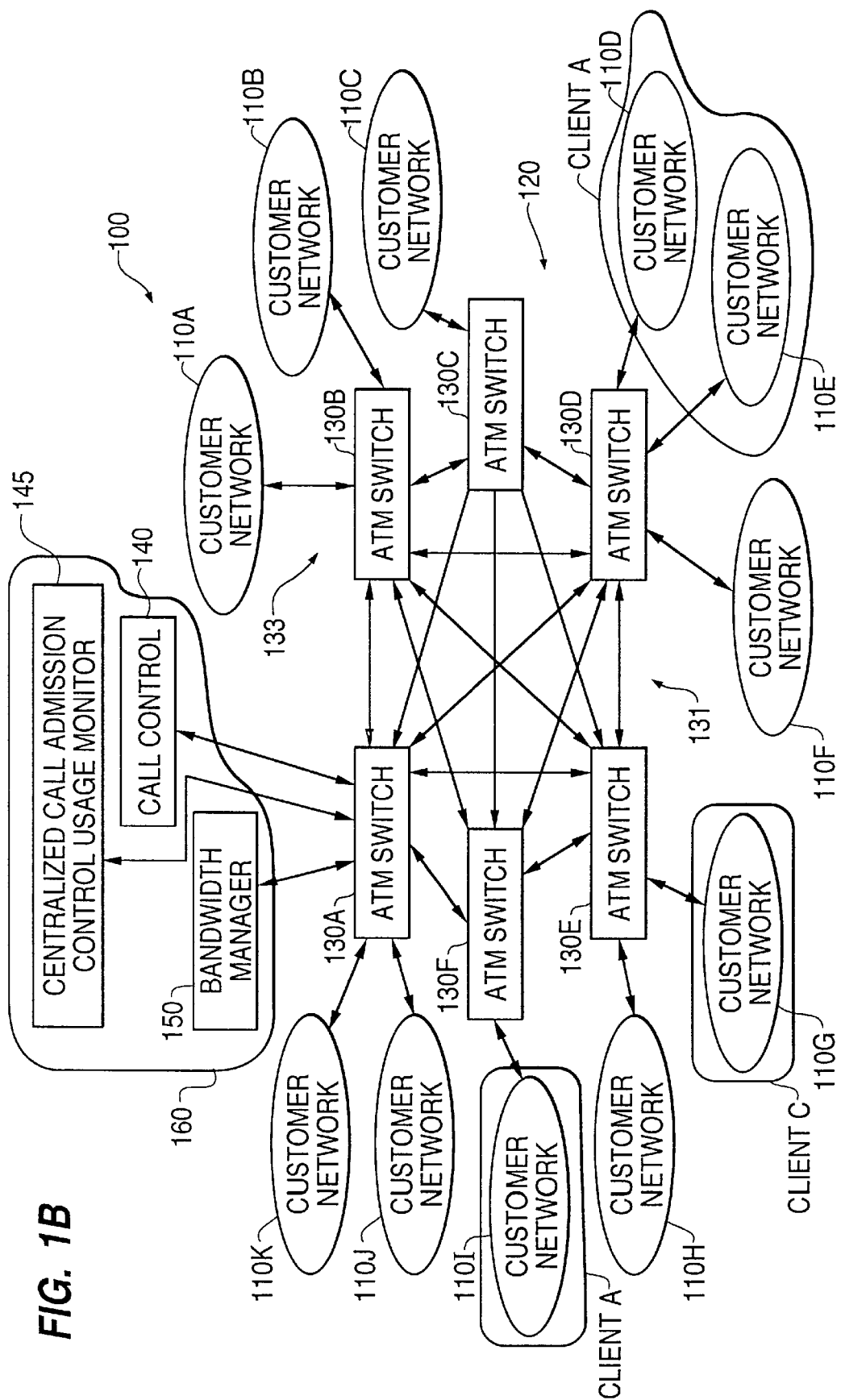
FIG. 1B is a diagram showing a preferred embodiment 100 having ATM Network 120 connected directly and/or indirectly to multiple customer networks 110A, 110B, 110C, . . . , and 110K via physical interfaces 133, wherein ATM Network 120 is comprised of ATM Edge Switches 130A, 130B, 130C, . . . , and 130F interconnected with one another via physical interfaces 131, at least one of which, ATM Edge Switch 130A, is connected to centralized control module 160 with bandwidth control module 150, centralized call admission control/usage monitor module 145, and call control module 140 via one physical interface 133.

FIG. 1B is a diagram showing an overview of a preferred embodiment 100 of an ATM network 120 verses a single virtual private network 170. Multiple virtual private networks, such as virtual private network 170 in FIG. 1A, are preferably installed on an ATM network, such as ATM Network 120 in FIG. 1B. ATM Network 120 has multiple customer networks 110A, 110B, 110C, . . . , and 110K electrically or optically coupled directly and/or indirectly to ATM Network 120 via physical interfaces 133. Customer networks 110A, 110B, 110C, . . . , and 110K may correspond to data networks and/or voice networks, both of which may be selectively grouped together to provide a virtual path network for one or more clients, such as for Clients A and B in FIGS. 1A and 1B.

ATM Network 120 in preferred embodiments is comprised of a plurality of ATM Switches, such as ATM Edge Switches 130A, 130B, 130C, . . . , and 130F, all of which are interconnected with one another via physical interface or transmission facilities 131 to form ATM Network 120. As with the single virtual private network 170 in FIG. 1A, at least one ATM switch, such as ATM Edge Switch 130A, is connected to centralized control module 160, which has submodules therein to manage various parameters used to define virtual paths and/or virtual channels, such as bandwidth and the number of calls. As explained above in reference to FIG. 1A, centralized control module 160 in FIG. 1B is comprised of call control module 140, centralized call admission control/usage monitor module 145, and bandwidth manager 150. Centralized control module 160 utilizes control features typically provided in ATM Edge Switches 130A, 130B, 130C, . . . , and 130F to control each individual ATM Edge Switch 130A, 130B, 130C, . . . , and 130F. In so doing, centralized control module 160 controls the creation and nature of virtual paths and virtual channels extending throughout the overall ATM Network 120 (in FIG. 1B).

Figure 2:
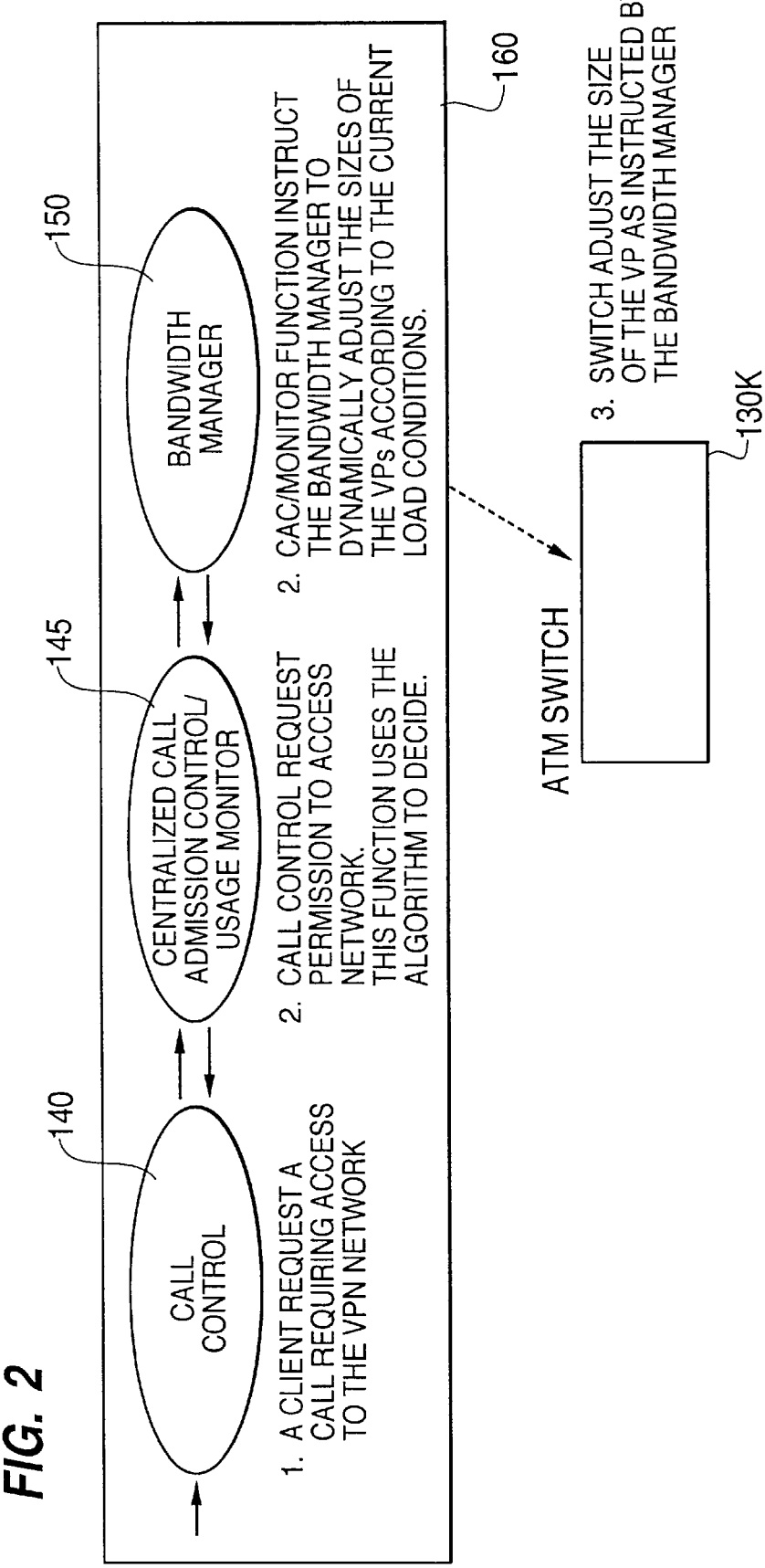
FIG. 2 is a diagram showing the detailed view of the interrelationship of call control module 140, centralized call admission control/usage monitor module 145, and bandwidth manager module 150 of centralized control module 160 and ATM Switch 130K.

FIG. 2 shows the interrelationship between call control module 140, centralized call admission control/usage monitor module 145, and bandwidth manager module 150 of centralized control module 160 and between bandwidth manager module 150 and ATM Switch 130K These interrelationships enable preferred embodiments to use an efficient control scheme to effectively manage and accommodate different traffic service requirements of a virtual path network Call control module 140 implements an overall, network-wide call admission strategy, which determines whether to admit or reject a request to allow a virtual connection to be setup. Using the procedure and apparatus discussed in co-assigned, the pending patent application, entitled "Enhanced Services for ATM Switching Using External Control," which was filed herewith and incorporated by reference above, call control module 140 handles specific client requests for a call requiring access to virtual private network 170 (in FIG. 1A). Using a procedure to implement a call admission strategy procedure, which is outlined in the flow chart shown in FIG. 8, centralized call admission control/usage monitor module 145 handles a request for permission to access virtual private network 170 (in FIG. 1A) that was received by call control module 140. Centralized call admission control/usage monitor module 145 determines what virtual paths and virtual channels are needed and, ultimately, will be connected, depending upon any number of factors, such as virtual path network customer service contract agreement, traffic type, quality of service expectations, and existing or expected traffic load and utilization. Moreover, if necessary, depending upon the current load conditions, centralized call admission control/monitor module 145 instructs bandwidth manager module 150 to dynamically adjust the size of each virtual path, virtual channel, and virtual path group with instructions to and from the CAC at specific ATM switches. ATM Switch 130K (and any other ATM switch in the ATM network) adjusts, alters, creates, or destroys the actual size of the virtual path, as instructed by the bandwidth manager module 150, so that, if possible, the call requested by a client to call control module 140 can be made. The CAC at each ATM switch checks every connection created or changed, no matter how or when it is created.

Figure 8:
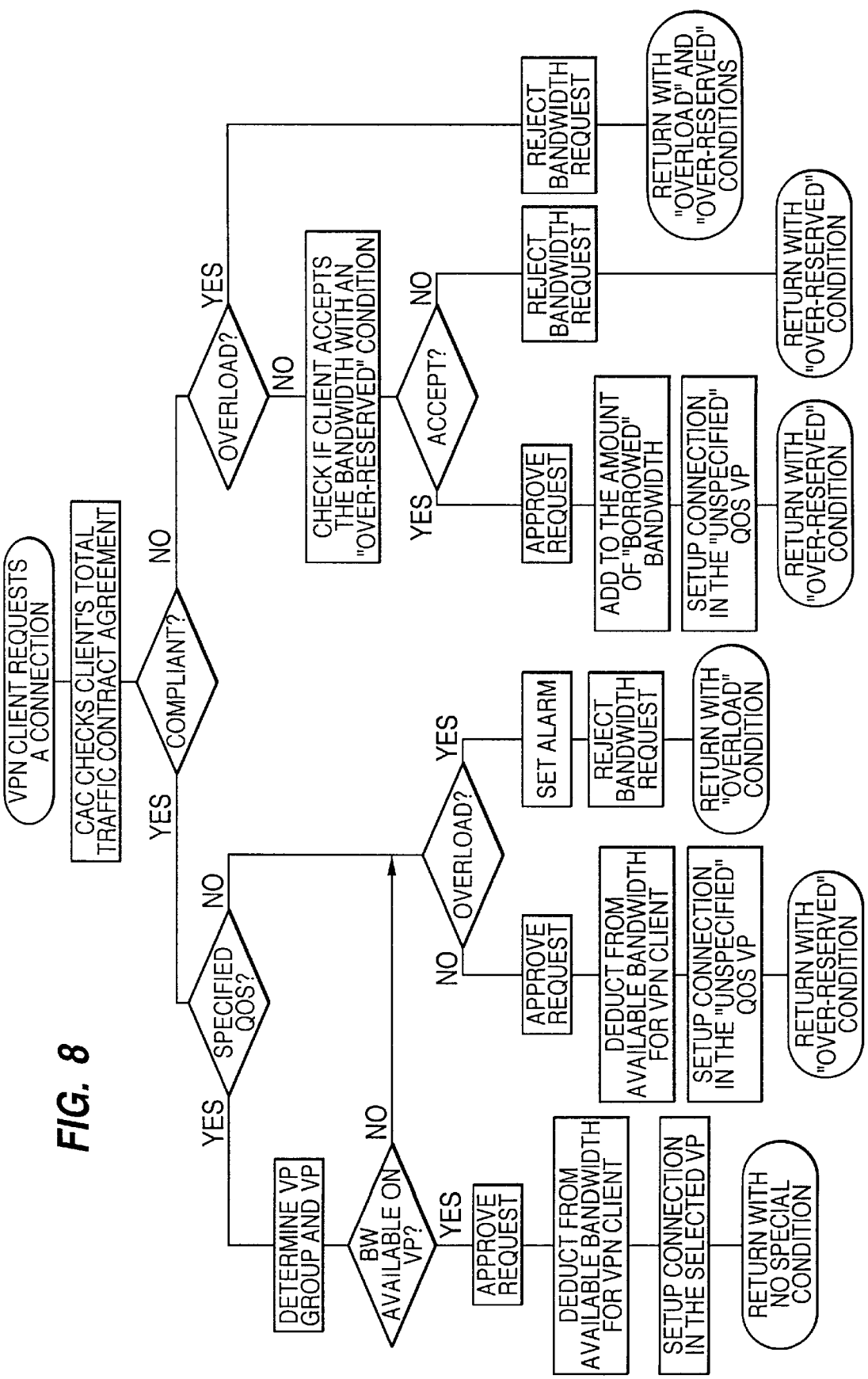
FIG. 8 is a flow diagram for the procedure implemented by centralized call admission control/usage monitor module 145 in FIGS. 1A, 1B, and 2.

In using the call admission process outlined in FIG. 8, centralized call admission control/monitor module 145 balances the needs of some clients against the needs of other clients using the virtual path network who may have contracted for varying amounts of capacities in real time. For instance, preferred embodiments of centralized control module 160 consider parameters set in service contract agreements with the clients for the allocation of an available bandwidth for virtual paths and virtual channels. Additional allocations can be negotiated by clients using virtual path resizing to add additional capacity needed to address requirements exceeding the levels specified by the service contract. Centralized call admission control/usage monitor module 145 takes the appropriate actions to guarantee the level of service as specified in the contract agreements. Consequently, preferred embodiments grant priority to connection requests which are compliant to the service contract agreements concerning virtual path networks. In addition, when a client using a virtual private network exceeds its service agreement, as mentioned above, it can "borrow" additional bandwidth from the provider of the virtual private network as long as the provider is not in an "overload" condition. The borrowed bandwidth requests are tagged and returned to the client using (or wanting to use) the virtual private network with a special "over-reserved" condition. Furthermore, bandwidth that is reserved with an "over-reserved" condition is generally not guaranteed and calls using this bandwidth are subjected to call loss in an overload condition. Connections with the "over-reserved" connections are set up in the virtual path with the unspecified quality of service. Finally, clients using the virtual private networks are responsible for accepting or rejecting calls when the virtual path network is in the overload condition. Clients of the virtual private network are also responsible for prioritizing their own calls. For example, in an overload condition, one client may decide to drop calls using a first-in-first-out basis, while another client may decide to drop a data application call to accommodate a voice call. Since this connection may be setup and torn down on demand, necessary computation processing is kept to a minimum.

Figure 9A:
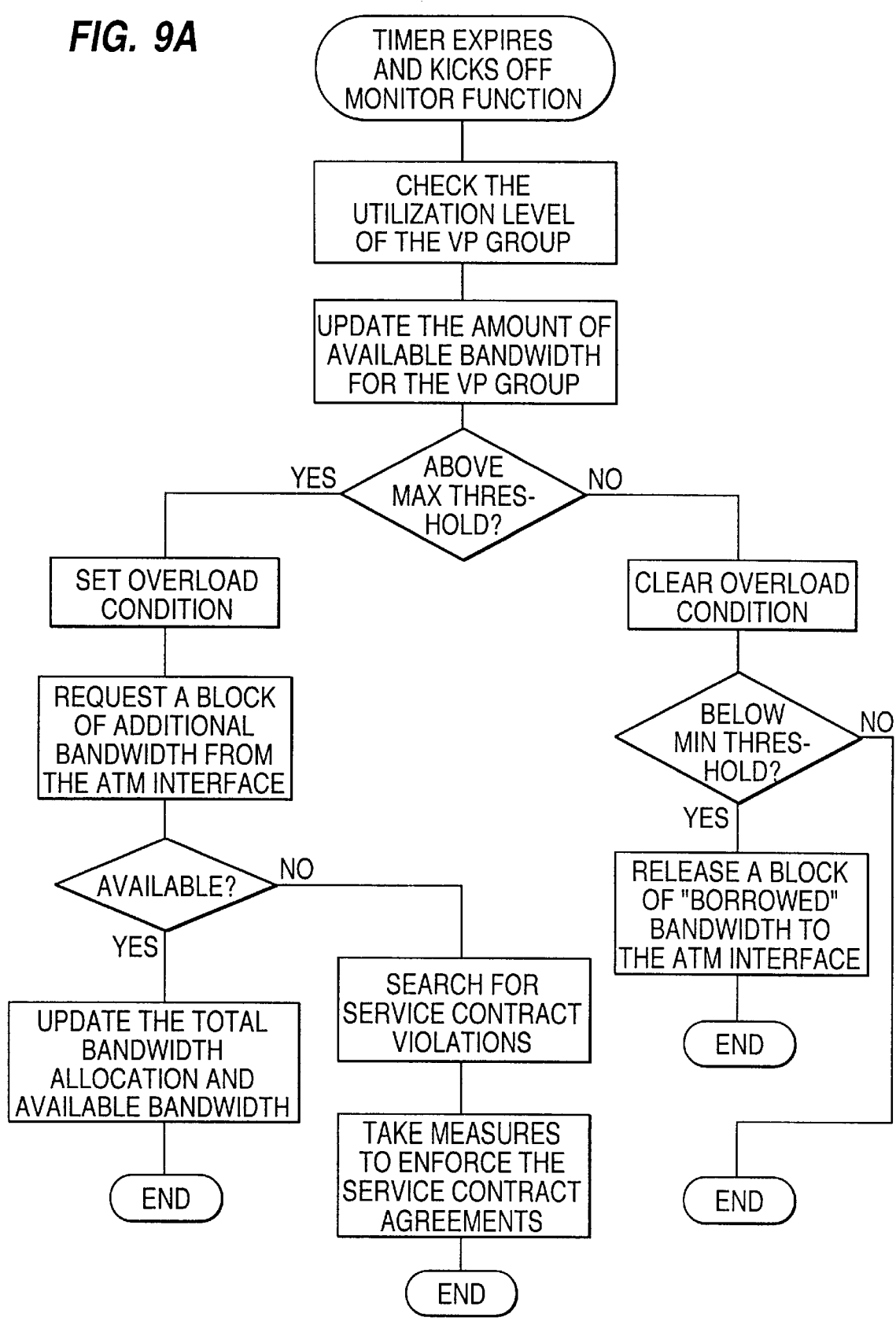
FIGS. 9A and 9B are flow diagrams for subprocedures implemented by centralized call admission control/usage monitor module 145 in FIGS. 1A, 1B, and 2, which are referenced in FIG. 8, that monitor the availability of unspecified virtual paths and check the utilization level of each virtual path group to determine whether an overload condition exists.
Figure 9B:
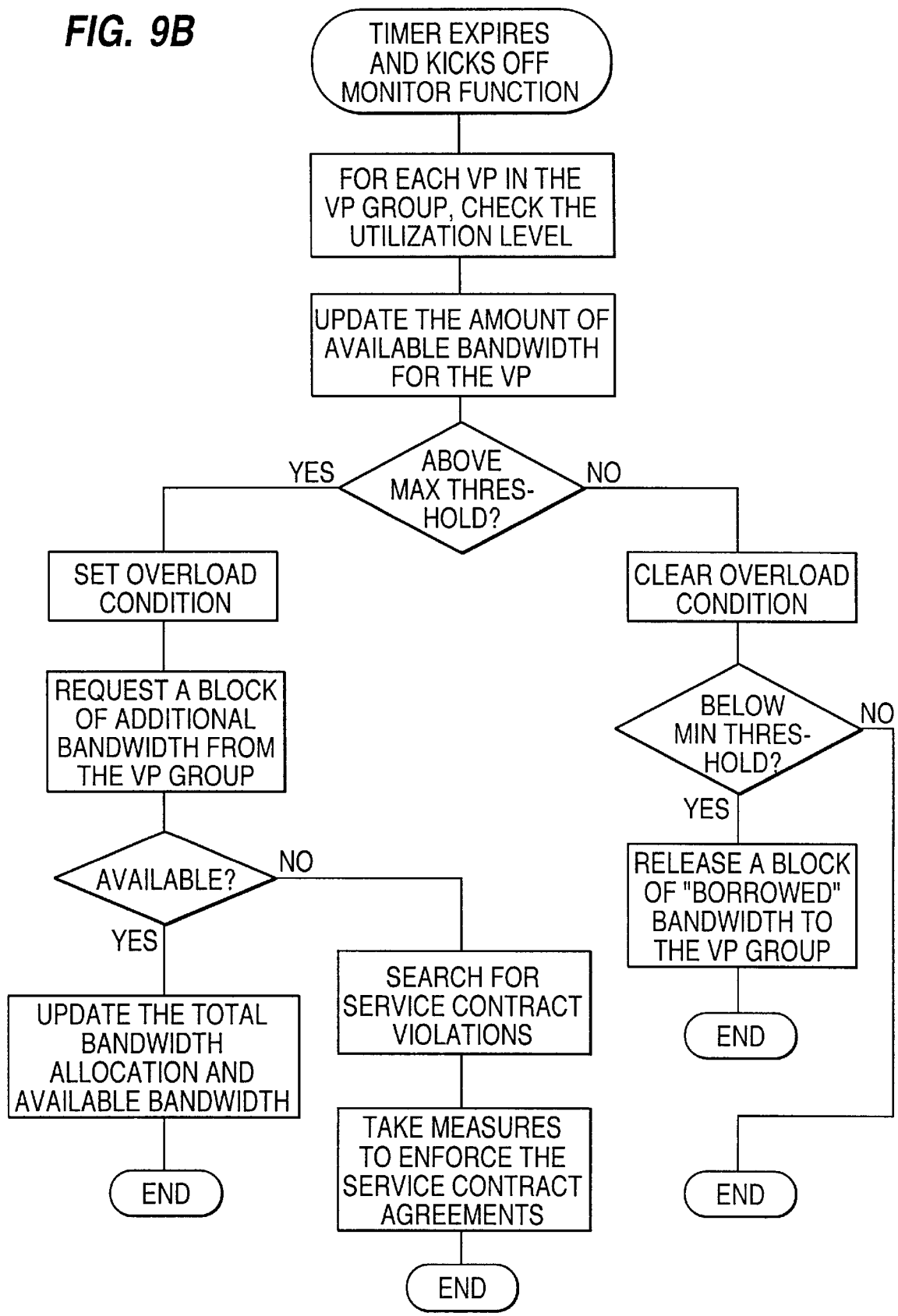

FIGS. 9A and 8B illustrate the subprocedures implemented by centralized call admission control/usage monitor module 145 in FIGS. 1A, 1B, and 2 and referenced in the flow diagram shown in FIG. 8. The ongoing background processes shown in FIGS. 9A and 9B monitor the traffic load of clients of virtual path networks and dynamically adjust the bandwidth allocation for each client of the virtual path network. Specifically, these background processes detect overload conditions and take necessary actions to address and relieve an overload condition. Flags or indicators of an overload condition are set when the actual utilization exceeds the utilization threshold, which craftsmen specify by provisioning. In addition, the background processes report service contract violations in the form of an alarm. Similarly, these background processes negotiate with the termination side to add a block of additional bandwidth when a maximum utilization threshold is exceeded in order to anticipate periods of over utilization and accommodate the extra bandwidth demand. Finally, these background processes release a block of "borrowed" bandwidth when the load falls below the minimum utilization threshold. Preferred background processes are generally divided into two subfunctions. In particular, as shown in FIG. 9A, one function monitors the client traffic load on the virtual private network and adjusts the bandwidth allocation for each virtual private group. Likewise, as shown in FIG. 9B, another function monitors the client traffic load on a virtual private network and adjusts the bandwidth allocation for each of virtual paths in the virtual path group.

As a result of the above operation, centralized control module 160 specifically directly and indirectly controls the operation of ATM Switch 130K in FIG. 2 (and other ATM Switches not shown in FIG. 2, such as ATM Edge Switches 130G, 130H, 130H, and 130J in FIG. 1A and ATM Switches 130A, 130B, 130C, . . . and 130F in FIG. 1B). This capability is, perhaps, most useful in managing the bandwidth assigned to a specific virtual path and a virtual path group. Centralized control module 160 enables preferred embodiments to dynamically adjust the bandwidth of a virtual path and/or a virtual path grouping to respond to varying requests of clients, which ensures that ATM physical interfaces are used to their fullest capacity. Centralized control module 160 allows a carrier to dynamically respond to changing needs of numerous clients (e.g., Clients A and B) that share the backbone network. In short, if a specific client is not using all of the capacity which the client has a reservation or a right to use (according to the contract), this unused capacity is made available to other clients. This function in centralized control module 160 is generally performed by bandwidth control module 150. Bandwidth control module 150 uses management interfaces found in ATM Switches 130A, 130B, 130C, . . . , and 130F, namely the management interface of each ATM switch that provisions the virtual paths and channels for each ATM switch, to control the size of the virtual path or paths within overall ATM Network 120.

Figure 3:
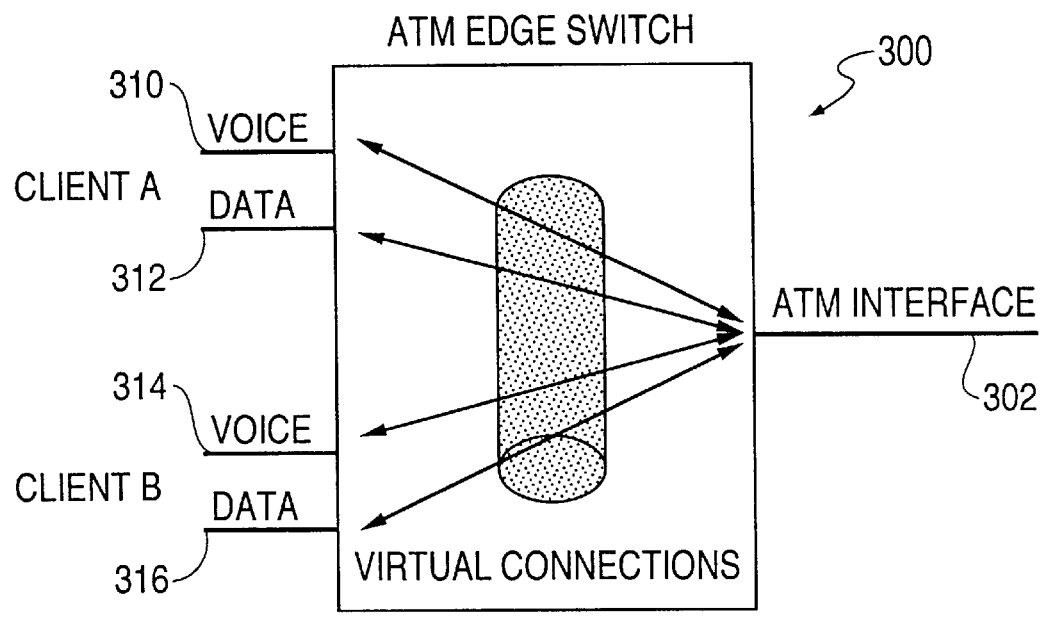
FIG. 3 is an enlarged view of ATM Switch 300 having physical interface 302 extending from ATM Switch 300, physical interfaces 310 and 312 transferring voice information and data information, respectively, for Client A, physical interfaces 314 and 316 transferring voice information and data information, respectively, for Client B, which corresponds to ATM Switch 130K (in FIG. 2), ATM Edge Switches 130G, 130H, 130I, and 130J (in FIG. 1A), and ATM Switches 130A, 130B, 130C, . . . and 130F (in FIG. 1B)

As shown in FIG. 3, the use of ATM switches, such as ATM Edge Switch 300, which corresponds to ATM Edge Switches 130G, 130H, 130I, and 130J shown in FIG. 1A, and ATM Edge Switches 130A, 130B, 130C, . . . , and 130F in FIG. 1B, enables preferred embodiments to consolidate multiple traffic types (e.g., voice and data) with varying quality of service expectations into a single ATM interface or a network. Specifically, note Client A uses physical interface 310 for various traffic and physical interface for data traffic 372, whereas Client B uses physical interface 314 for various traffic and physical interface 316 for data traffic, all of which are consolidated on ATM interface 302 by ATM edge switch 700.

The operation of centralized control module 160 is, perhaps, best understood in relation to an example. The first step performed by centralized call admission control/usage monitor module 145 of centralized control module 160 is to check the service contract agreement for each client for which the call was initiated to determine whether or not to accept the call, what quality of service to provide, what to charge the client, and for directions as to how to make the connections. In the following example, please refer to FIG. 1A and define physical interface 141A as "Interface 1," physical interface 141B as "Interface 2," physical interface 141C as "Interface 3," and physical interface 141D as "Interface 4." Furthermore, suppose that the service contract agreement between the carrier managing the virtual private network 170 (in FIG. 1A) and/or network 120 (in FIG. 1B) and Client A guarantees 93 MB/sec at Interface 1 and 62 Mb/sec at Interface 2. a situation in which Client A desires connection(s) having a maximum total bandwidth of 155 Mb/second total and Client B desires connection(s) also having a maximum total bandwidth of 155 Mb/second total. While other breakups may be possible, one breakup for Clients A and B provided by centralized control module 160 for Interfaces 1, 2, 3, and 4 is shown in TABLE 1:

CLIENT A

BREAKUP BY INTERFACE

Interface 1: 60% total bandwidth=93 Mb
Initial allocation:

| Quality of Service 1: | 20%(of 93Mb) = 18.6Mb |
|---|---|
| Quality of Service 2: | 50%(of 93Mb) = 46.4Mb |
| Unspecified Quality of Service: | 30%(of 93Mb) = 27.9Mb |

Interface 2: 40% total bandwidth (155 Mb)=62 Mb
Initial Allocation

| Quality of Service 1: | 20%(of 62Mb) = 18.6Mb |
|---|---|
| Unspecified Quality of Service: | 80%(of 62Mb) = 49.6Mb |

CLIENT B

BREAKUP BY INTERFACE

Interface 1: 40% total bandwidth (155 Mb)=62 Mb
Initial allocation:

| Quality of Service 1: | 20%(of 62Mb) = 18.6Mb |
|---|---|
| Quality of Service 2: | 50%(of 62Mb) = 46.4Mb |
| Unspecified Quality of Service: | 30%(of 62Mb) = 18.6Mb |

Interface 3: 60% total bandwidth (155 Mb)=93 Mb
Initial Allocation

| Quality of Service 1: | 20%(of 93Mb) = 18.6Mb |
|---|---|
| Unspecified Quality of Service: | 80%(of 93Mb) = 74.4Mb |

TABLE 1: Breakup for Clients A and B for Interfaces 1, 2, 3 and 4

The assignments of Clients A and B for Interfaces 1, 2, 3, and 4 are shown for this example in the following TABLE 2.

INTERFACE 1

Client A: 93 Mb Assigned

| 18.6 Mb for Quality Of Service 1 |
|---|
| 46.5 Mb for Quality Of Service 2 |
| 27.9 Mb Unspecified |

Client B: 62 Mb Assigned

| 12.4 Mb for Quality Of Service 1 |
|---|
| 31 Mb for Quality Of Service 2 |
| 18.6 Mb Unspecified |

INTERFACE 2

Client A: 62 Mb Assigned

| 18.6 Mb for Quality Of Service 1 |
|---|
| 49.6 Mb Unspecified |

Available Bandwidth for Reservation: 93 Mb

INTERFACE 3

Client B: 93 Mb Assigned

| 18.6 Mb for Quality Of Service 1 |
|---|
| 74.4 Mb Unspecified |

Available Bandwidth for Reservation: 62 Mb

INTERFACE 4

Available Bandwidth for Reservation: 155 Mb

TABLE 2: Assignments for Clients A and B for Interfaces 1, 2, 3 and 4

FIGS. 4A, 4B, 4C, and 4D are diagrams illustrating the relationship between the reserved and available bandwidth for specific ATM physical interfaces 141A, 141B, 141C, and 141D (in FIG. 1A) for the above example. The relative size of each enclosed circle or oval reflects the size (e.g., in terms of bandwidth) of the actual virtual path and/or virtual path group. As a general rule, the actual size of the virtual path adjusts (or is adjusted by centralized control module 160) dynamically based upon the utilization level of that virtual path, as indicated by the bidirectional arrows crossing the borders of regions corresponding to virtual paths and virtual channels. The size of each virtual group of virtual paths is dependent upon the terms and conditions within the service contract agreement between a client and the carrier. Once again, the sizes of the virtual path groupings are adjusted by centralized control module 160 based upon the utilization levels. As shown in FIG. 8 and explained in the corresponding text, if the size needed by some client increases beyond a certain contractually defined point, the calls from the client admitted will be tagged as using 'over-reserved' capacity within the specific physical interface and will use the unspecified quality of service as defined by the ATM forum.

Specifically, referring to FIG. 4A, in Interface 1, region 401 corresponds to the virtual path group for Client A in the above example, which represents 93 Mb, whereas region 402 corresponds to the virtual path group for Client B in the above example, which represents 93 Mb. Also, note within virtual path group 401, virtual paths 403 and 404 have been created, one for each quality of service promised Client A in virtual path group 401. Similarly, within virtual path group 402 for Client B, virtual paths 405 and 406 have been created, one for each quality of service promised for Client B in virtual path group 402. Additional or leftover capacity (or area) within virtual path group 401 and virtual path group 402 is unspecified. The total bandwidth capacity for virtual group 401 and virtual group 402 equals 155 Mb, which is the total fixed capacity of Interface 1. There is not any unassigned bandwidth capacity that is available for reservation.

Referring to FIG. 4B, in Interface 2, the region 408 corresponds to the virtual path group for Client A in the above example, which represents 62 Mb. Within virtual path group 408 for Client A, virtual path 407 has been created for the specific quality of service for Client A in virtual path group 408. Additional bandwidth capacity (or area) within Interface 2 is available for reservation. Similarly, additional bandwidth capacity within virtual path group 408 is unspecified.

Referring to FIG. 4C, in Interface 3, region 409 corresponds to the virtual path group for Client B in the above example, which represents 93 Mb. Within virtual path group 409 for Client B, virtual path 410 has been created for the specific quality of service for Client B in virtual path group 409. Additional bandwidth capacity (or area) within Interface 3 is available for reservation. Similarly, additional bandwidth capacity within virtual path group 409 is unspecified.

Referring to FIG. 4D, no virtual path groups and/or virtual paths for any client have been assigned to Interface 4, so the entire bandwidth capacity, 155 Mb, of Interface 4 is available for reservations.

Figure 6:
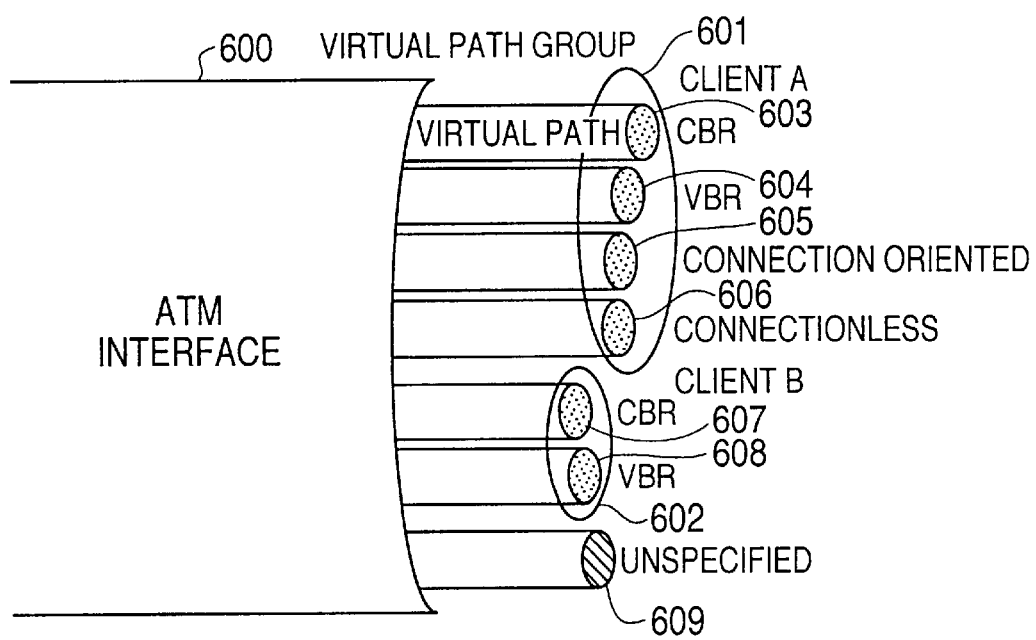
FIG. 6 is a diagram showing a more generalized view of the use of virtual path groups in an ATM physical interface for Clients A and B with varying traffic types by preferred embodiments.
Figure 5C:
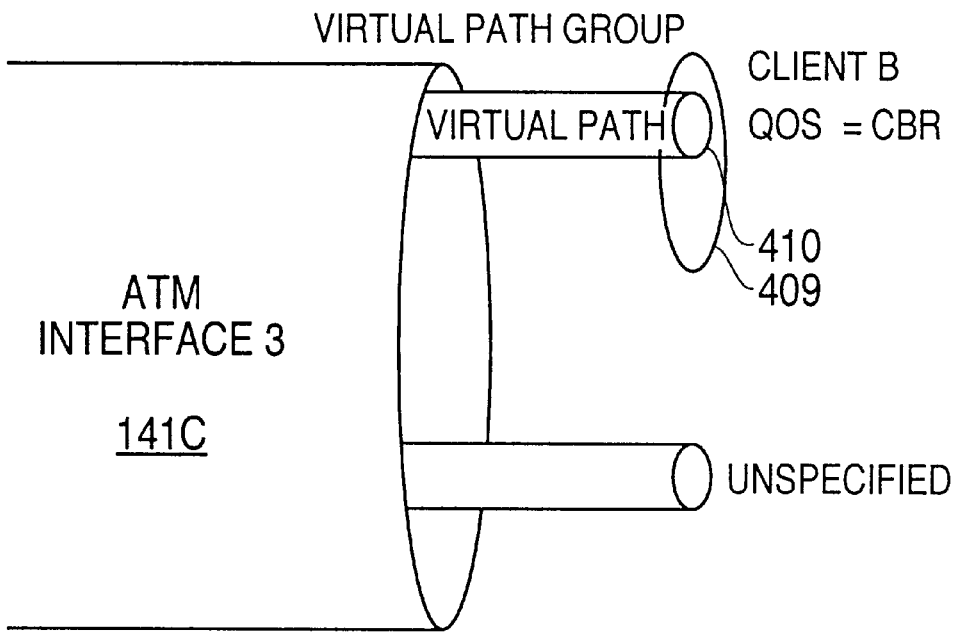
Figure 5D:
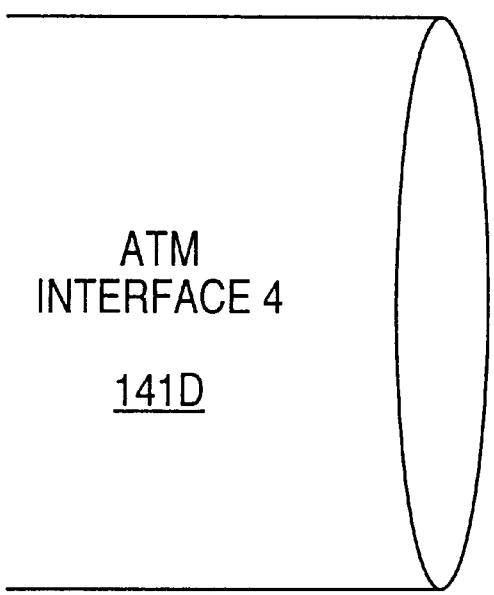

FIGS. 5A, 5B, 5C, and 5D are diagrams showing a switch level view of separate ATM physical interfaces (physical interfaces 141A, 141B, 141C, and 141D correspond to FIG. 1A), for Clients A and B. Note that the quality of service has been defined when applicable. For instance, the Quality of Service 1 has been generally defined as Constant Bit Rate ("CBR") traffic and Quality of Service 2 has been generally defined as Variable Bit Rate ("VBR") traffic. Note, as shown in FIG. 6, alternate assignments for other quality of service types can be made. Referring to FIG. 6, for ATM Interface 600 between ATM Switches A and B (not shown), for each virtual path group, a unique virtual path will be provisioned for each specific traffic type as indicated by its quality of service requirements. One additional virtual path will be provisioned for "unspecified" quality of service, which will be used by the virtual path network service provider to offer an "unguaranteed" service or a "best-effort" service. In particular, if Client A requires or contracts for a certain amount of capacity for CBR traffic (for voice and video), VBR traffic (for packetized audio and video), Connection-Oriented traffic (for frame-Relay), and/or Connectionless traffic (for IP traffic), Client A will be assigned a virtual path group 601 having virtual paths 403 for CBR traffic, virtual path 604 for VBR, virtual path 605 for Connection-Oriented traffic, and virtual path 606 for Connectionless traffic. Similarly, if Client B requires or contracts for a certain amount of capacity for CBR and VBR traffic, but not any virtual paths for any other forms of traffic (e.g., connection-oriented traffic and connectionless traffic), Client B will be assigned virtual path group 602 having virtual paths for CBR traffic and virtual path 608 for VBR traffic. As a general rule, the bandwidth requirements are calculated differentiates for each quality of service. Virtual path 609 is not a member of any virtual path group and is unspecified and otherwise available to be used on an 'as-needed' case by either Client A, Client B, or another client.

Preferred embodiments take advantage of the fact that each allocation to each client has varying amounts of unspecified quality of service capacity and that, while Interface 1 appears to be completely booked, Interfaces 2 and 3 have varying amounts of bandwidth that is available to be reserved by Clients A and/or B and/or any other client and Interface 4 appears to be completely clear of any reservations. Thus, bandwidth reserved is not necessary equal to bandwidth utilized. Centralized control module 160 simultaneously balances the use of the under utilized bandwidth and the obligations to the service contract agreements and prevents overload conditions to use each ATM Switch and the overall ATM network to the utmost. By comparison, traditional time multiplexed systems dedicate transmission and switching resources when a call "reserves" bandwidth during call setups, which ties up the capacity for the call duration, even if all of the capacity is not needed. Thus, as far as its call admission control system is concerned, bandwidth reserved is equal to bandwidth utilized, which means large portions of physical interfaces are not used on an ongoing basis and there is no way to actively and systematically utilize such unused capacity.

Figure 7A:
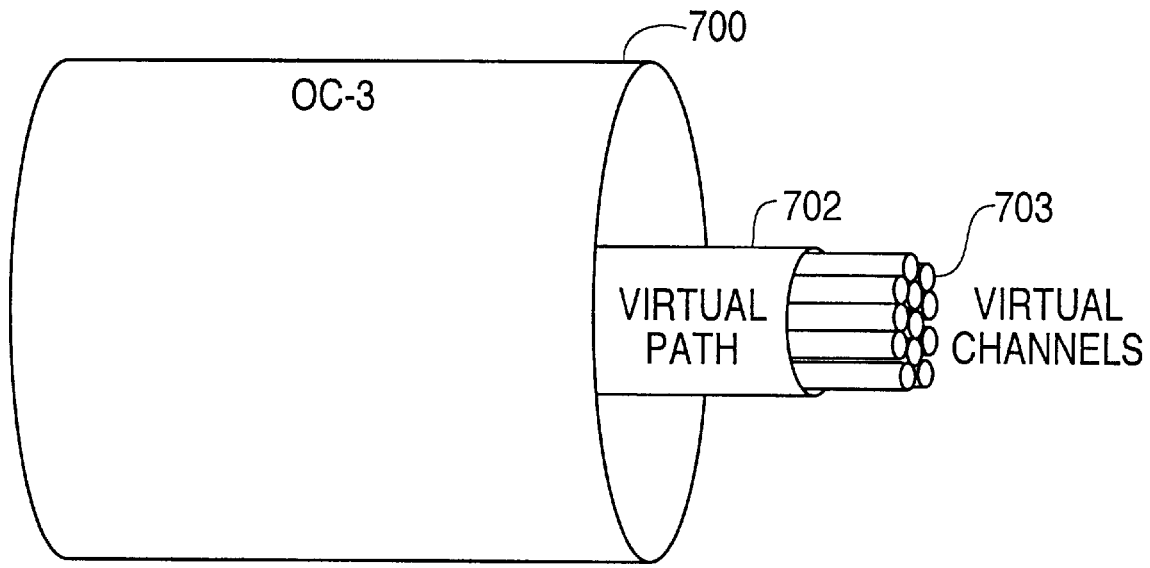
FIGS. 7A and 7B are drawings that highlight the organization and relationship between virtual paths 702 and virtual channels 703 that are managed and controlled by bandwidth manager module 150 of centralized control module 160 (in FIG. 1A)
Figure 7B:
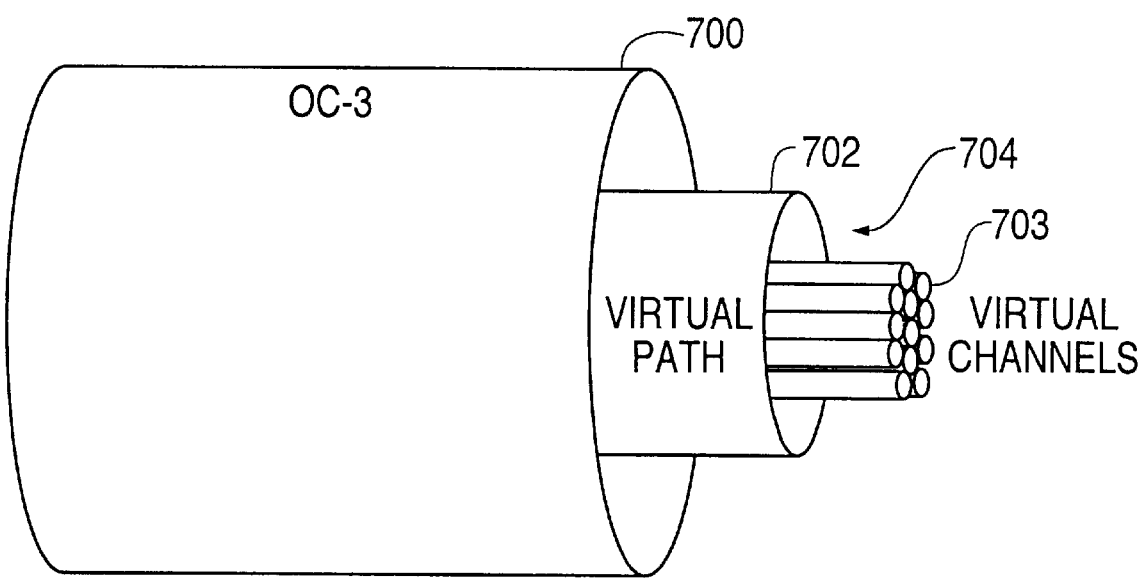

Referring to FIG. 7A, the bandwidth capacity of a transmission facility 700 (e.g., SONET OC-3 fiber optic facility, which has a bandwidth capacity of 155 Megabits per second (Mb/s)), virtual path 702, and virtual channels 703 are conceptually represented by "pipes" of various sizes that are nested inside of each other, wherein the diameter of each pipe represents the bandwidth of transmission facility 700, virtual path 702, and virtual channels 703. Virtual path 702 may be comprised of at least one virtual channel 403, which reside inside virtual path 702. Note, however, a virtual path is not required to hold any virtual channels, but every virtual channel must be in a virtual path. Of course, although not shown in FIG. 7A (see FIG. 6), transmission facilities 700 may contain additional virtual paths, other than virtual path 702 and these additional virtual paths would rest inside transmission facility 700, like virtual path 702. As shown in FIG. 7A, virtual channels 703 consume all of the available bandwidth of virtual path 702. As a result, any attempt to create an additional virtual channel 703 in virtual path 702 will be denied by the CAC of the ATM switch. As shown in FIG. 4B, preferred embodiments of bandwidth manager module 150 effectively increased or otherwise adjusted the size of virtual path 702 to provide extra capacity 704, so that additional virtual channels 703 can be created to accommodate varying demands of clients on an ATM Network, such as ATM network 120 in FIG. 1B.

Bandwidth manager module 150 dynamically manages bandwidths utilized by virtual paths in reaction or anticipation to traffic volume levels. For instance, as shown in TABLE 3, data traffic, such as e-mail and file transfers, and voice traffic, such as telephone conversations, typically vary throughout a day, but data traffic, unlike voice traffic, can be put off until the evening hours. Thus, bandwidth manager module 150 changes the virtual path sizes of virtual paths and virtual path groups according to time of day.

| TIME | VOICE BANDWIDTH | DATA BANDWIDTH |
|---|---|---|
| 6 a.m.–6 p.m. | 60% | 40% |
| 6 p.m.–6 a.m. | 15% | 85% |

TABLE 3: Bandwidth Management Example Schedule

Figure 10:
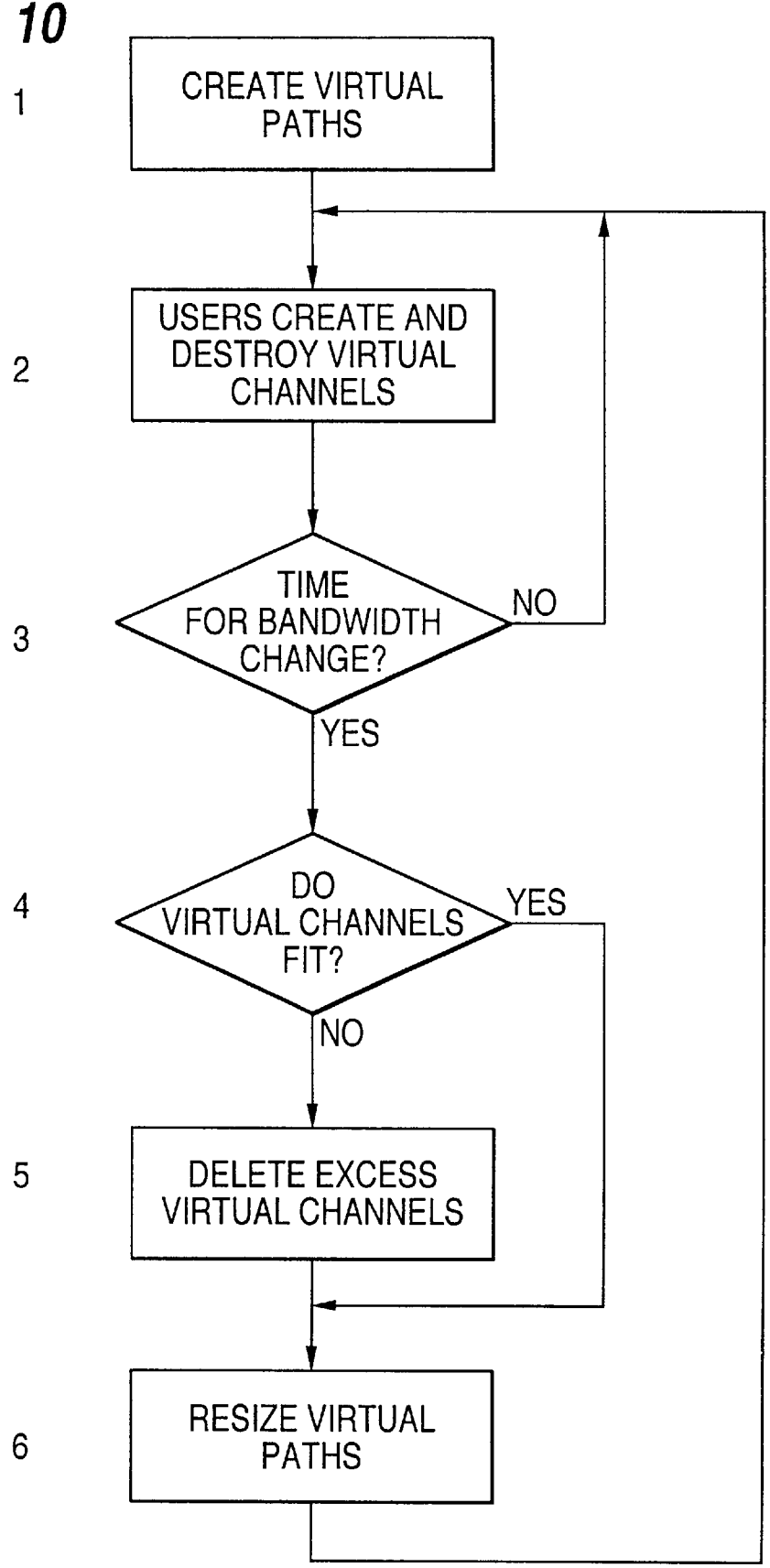
FIG. 10 is a flow diagram for the procedure implemented by bandwidth manager module 150 in FIGS. 1A, 1B, and 2.

FIG. 10 is a flow diagram for the procedure implemented by bandwidth manager module 150 in FIGS. 1A, 1B, and 2. Specifically, as discussed above, virtual paths are set up for each customer to provide desired connectivity to the specific customer sites and desired bandwidth for each traffic type according to the current time of day. Next, either customers or bandwidth manager module 150 create and destroy corresponding virtual channel(s) within the virtual path(s) as needed. Each virtual channel that is created must be in one of the existing virtual paths, which have been set up for that specific customer. When a virtual channel is created, the CAC of each switch in the ATM network through which the virtual channel extends determines whether or not the virtual channel will fit in the specified (or corresponding) virtual path. Bandwidth manager module 150 then checks the customer contract and current time of day to determine whether it is permissible (the correct time) to make needed bandwidth changes. Remember, as a general rule, different bandwidths are assigned to handle different types of transmissions (e.g., data or voice) on specific virtual channels, depending upon the time of day. If it is not permissible to make the needed bandwidth changes, then bandwidth manager module 150 creates and destroys virtual channels as needed to make space for the requested virtual channel. Alternatively, if it is permissible to make the needed bandwidth changes, bandwidth manager module 150 calculates the sum of the bandwidth for all virtual channels on each virtual path to determine whether the total virtual channel bandwidth is larger than the new virtual path bandwidth specified by the customer contract for the current time of day period. If the requested (or needed) virtual channels do, indeed, fit inside the virtual path, then virtual paths are resized. If the requested (or needed) virtual channels do not fit, bandwidth manager module 150 uses the ATM switch management interface to delete virtual channels until the sum of the virtual channel bandwidth is below the new virtual path bandwidth and, then, the virtual paths are resized, such that preferred embodiments use the ATM management interface to change the size of each virtual path so that it conforms to the customer contract value for the current time of day.

FURTHER MODIFICATIONS AND VARIATIONS

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, while a specific physical interface was described above, other physical interfaces can be used as well, such as T1, T3, 25 Mb ATM, OC-3, OC-12, OC-48, OC-192, and 100 Mb TAXI. Note the ATM Forum, an industry consortium, have approved several of these physical interfaces and may approve other such interfaces in the future that could likely be used in preferred embodiments. In addition, physical interfaces may be based on or utilize conductive wiring, such as twisted pair, fiber optic, coax, wireless transmission facilities and/or any combination thereof. Similarly, in addition to ATM switches, other switches can be used as well, so long as the ATM switches are compatible with UNI 3.0 or greater and provide a management interface that allows the creation, deletion, and resizing of virtual path connections. Northern Telecom's Concorde™, Vector™, and Passport™ switches generally satisfy these requirements and are preferred for that reason, but other switches may also satisfy these requirements and may be used. Also, please note that while the above discussion generally described electrical connections as "connections," or being directly and/or indirectly "connected," it should be noted that these connections may also be coupled electrically, optically, or electromagnetically (e.g., radio signals and wireless transmissions). Control module 160 can use alternate procedures to control the operation of the ATM switches and the sizing and creation of virtual paths and channels, in addition to or in lieu of the preferred procedures shown in FIGS. 8, 9A, and 9B. In addition, note that the procedures that are implemented by centralized control module 160, call control module 140, centralized call admission control/usage module 145, and bandwidth manager module 150 in preferred embodiments use software on a computer equipped platform that directs each individual ATM switch in an ATM network While prewired control systems could be designed and built implementing the following control mechanism and may be used, software control mechanisms are preferred, because software control mechanisms are substantially more flexible and enable the carrier operating ATM network to easily update and refine procedures used to control ATM switches. Software control mechanisms can also be easily updated to handle varying types of ATM switches, when such ATM switches are modified and/or updated.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed:

1. A system, comprising:
    (a) a plurality of interconnected asynchronous transfer mode switches that are interconnected with one another via at least one physical interface to form a network, said network used to transfer various types of information, each interconnected asynchronous transfer mode switch of said plurality of interconnected asynchronous transfer mode switches having a connection admission control module to determine whether a virtual connection can be connected through that particular interconnected asynchronous transfer mode switch of said plurality of interconnected asynchronous transfer mode switches, said virtual connection connecting one interconnected asynchronous transfer mode switch of said plurality of interconnected asynchronous transfer mode switches to at least one other interconnected asynchronous transfer mode switch of said plurality of interconnected asynchronous transfer mode switches via a link of said at least one physical interface; and (b) a system control module connected to at least one interconnected asynchronous transfer mode switch of said plurality of interconnected asynchronous transfer mode switches, said system control module determines whether said virtual connection can be created in said network, wherein said system control module on an on-going basis determines whether said network is in an overload condition and said system control module also checks said overload condition and determines whether said virtual connection can be set up for said network and further wherein said virtual connection is comprised of at least one virtual path group and each virtual path group of said at least one virtual path group is comprised of at least one virtual path and further wherein each virtual path group has a first utilization level and each virtual path has a second utilization level and said system control module checks said second utilization level of each virtual path in one virtual path group and then said first utilization level of said virtual path group to establish said overload condition.

2. The system of claim 1, further wherein said system control module considers at least one factor to determine whether said virtual connection through said network can be made, said at least one factor is selected from a group consisting of terms and conditions of a network contract agreement covering said virtual connection, type of information that said virtual connection will transfer, quality of service expected of said virtual connection, existing traffic load of said network, and utilization of said network.

3. The system of claim 1, wherein said virtual connection is requested by a client, said client signed an agreement concerning said client's use of said network, said agreement defining certain conditions concerning parameter expectations and quality of service expectations, and wherein said virtual connection has corresponding parameter requirements and quality of service requirements, said system control module checks said agreement to ensure that said corresponding parameter requirements and quality of service requirements of said virtual connection are compliant with said parameter expectations and said quality of service expectations of said agreement.

4. The system of claim 1, wherein said virtual connection is requested by a client, said client signed an agreement concerning said client's use of said network, said agreement defining parameter requests for said virtual connection that are available to said client, and wherein said virtual connection has corresponding parameter requirements and quality of service requirements, and said system control module performs step (i) checks with said agreement to determine whether said corresponding parameter requirements of said virtual connection are compliant with said agreement; step (ii) checks with said agreement governing quality of service requests to determine whether said quality of service requirements of said virtual connection is compliant with said agreement; and step (iii) determines whether said virtual connection has any available capacity.

5. The system of claim 4, wherein said system control module performs said step (i) before said step (ii) and before said step (iii).

6. The system of claim 5, wherein said system control module performs step (ii) before said step (iii).

7. The system of claim 1, wherein said system may be in an overload condition, if said system is not in said overload condition and said system control module does not otherwise allow said virtual connection to be created, said system control module allows said virtual connection to be set up in unspecified capacity of said network.

8. The system of claim 7, wherein said virtual connection has a bandwidth and, if said system is not in said overload condition, said system control module further adds a bandwidth amount corresponding to said bandwidth of said virtual connection to a running sum of used bandwidth capacity.

9. The system of claim 1, wherein said at least one physical interface is selected from a group consisting of fiber optic, twisted pair, coax, and wireless.

10. The system of claim 1, wherein said various types of information includes information selected from a group consisting of constant bit rate information, voice information, video information, variable bit rate information, data information, connection-oriented information, frame-relay information, and connectionless information.

11. The system of claim 1, wherein said virtual connection is selected from a group consisting of virtual paths and virtual channels and any combination of virtual paths and virtual channels.

12. The system of claim 1, wherein said network has a network utilization level and further wherein said system control module periodically and continuously checks said network utilization level of said network.

13. The system of claim 1, further wherein each interconnected asynchronous transfer mode switch of said plurality of interconnected asynchronous transfer mode switches has a connection admission control module to determine whether said virtual connection can be connected to that particular interconnected asynchronous transfer mode switch of said plurality of interconnected asynchronous transfer mode switches and said system control module communicates with each connection admission control module of each interconnected asynchronous transfer mode switch of said plurality of interconnected asynchronous transfer mode switches that will be connected to another interconnected asynchronous transfer mode switch of said plurality of interconnected asynchronous transfer mode switches by said virtual connection through said network in determining whether said virtual connection can be created in said network.

14. A system of monitoring use of a network, said network used to transfer information from a first location to a second location, comprising:

(a) a plurality of interconnected asynchronous transfer mode switches that are interconnected with one another via at least one physical interface to form said network and a virtual path group connecting one interconnected asynchronous transfer mode switch of said plurality of interconnected asynchronous transfer mode switches to at least one other interconnected asynchronous transfer mode switch of said plurality of interconnected asynchronous transfer mode switches via a first physical interface of said at least one physical interface, said virtual path group comprised of at least one virtual path, each virtual path is comprised of at least one virtual channel; and (b) a system control module connected to at least one interconnected asynchronous transfer mode switch of said plurality of interconnected asynchronous transfer mode switches, said system control module determines whether said virtual path group can be created in said network, said system control module determines whether said at least one virtual channel of each said virtual path can be created in said network, wherein each virtual path group has a first utilization level and each virtual path has a second utilization level and said system control module checks said second utilization level of each virtual path in one virtual path group and said first utilization level of said virtual path group to determine whether said at least one virtual channel of said virtual path can be created.

15. The system of claim 14, wherein a client is allowed to use said network under certain circumstances, and further wherein said system control module compares a request from said client to use said virtual path group with a contract having terms and conditions governing said certain circumstances to determine whether said request of said client is complaint with said terms and conditions found in said contract.

16. The system of claim 15, wherein if said request of said client is not compliant with said terms and conditions of said contract, said system control module determines whether said network is presently overloaded or not, and, if said network is not presently overloaded, said network utilizes unspecified virtual channels in said virtual path group to satisfy said request of said client.

17. The system of claim 15, wherein said terms and conditions define quality of service expectations and certain parameter restrictions.

18. The system of claim 17, further wherein if said system control module determines that said request from said client is not compliant with said quality of service expectations or said certain parameter restrictions, said system control module determines whether said network is presently overloaded, and, if said network is not presently overloaded, said network utilizes unspecified capacity in any one of said at least one virtual path groups to satisfy said request of said client.

19. The system of claim 14, wherein said network has a network utilization level and further wherein said system control module periodically and continuously checks said network utilization level to determine whether said network is overloaded, whether said virtual path group can be created, and whether said at least one virtual channel of said virtual path can be created.

20. The system of claim 14, wherein system control module considers at least one factor to determine whether said virtual path grouping or said virtual channel can be formed, said at least one factor is selected from a group consisting of terms and conditions of a network contract agreement covering a client's unspecified capacity, type of information transferred, quality of service expectations, existing traffic load of said network and utilization of said network.

21. The system of claim 14, further wherein each interconnected asynchronous transfer mode switch of said plurality of interconnected asynchronous transfer mode switches has a connection admission control module to determine whether said virtual channel of each virtual path can be connected to that particular interconnected asynchronous transfer mode switch of said plurality of interconnected asynchronous transfer mode switches and wherein said system control module communicates with each connection admission control module of each interconnected asynchronous transfer mode switch of said plurality of interconnected asynchronous transfer mode switches that will be connected to another interconnected asynchronous transfer mode switch of said plurality of interconnected asynchronous transfer mode switches by said virtual path group through said network to determine whether said virtual path group can be created and whether said at least one virtual channel of each virtual path can be created in said network.

22. The system of claim 15, wherein said physical interface has a corresponding physical interface utilization level and further wherein said system control module periodically and continuously checks said corresponding physical interface utilization level to determine whether said virtual connection should be created.

23. A process of monitoring an utilization level of a grouping of virtual paths on a physical interface, comprising:

(a) checking said utilization level of said grouping of said virtual paths;

(b) updating a grouping amount of available bandwidth for said grouping of said virtual paths;

(c) comparing said grouping amount of available bandwidth with a maximum grouping threshold for said available bandwidth and setting an overload condition if said amount of available bandwidth exceeds said maximum grouping threshold and clearing said overload condition if said grouping amount of available bandwidth is below said maximum grouping threshold;

(d) requesting a block of an additional bandwidth from said physical interface if said amount of available bandwidth exceeds said maximum grouping threshold; and (e) searching for violations of terms and conditions of client contracts and taking measures to enforce client contracts if said additional bandwidth from said physical interface is not available.

24. The process of monitoring said utilization level of said grouping of virtual paths of claim 23, further comprising:

(d) comparing said grouping amount of available bandwidth to a minimum grouping threshold condition and releasing a block of borrowed bandwidth to said physical interface if said grouping amount of available bandwidth is below said minimum grouping threshold condition.

25. The process of monitoring said utilization level of said grouping of virtual paths of claim 23, further comprising:

(d) requesting a block of an additional bandwidth from said physical interface if said amount of available bandwidth exceeds said maximum grouping threshold; and (e) updating a total bandwidth allocation and said available bandwidth if block of said additional bandwidth from said physical interface is available.

26. A process of monitoring an utilization level of a grouping of a virtual path on a physical interface, comprising:

(a) checking said utilization level of said virtual path;

(b) updating a virtual path amount of available bandwidth for said virtual path;

(c) comparing said amount of available bandwidth with a maximum virtual path threshold for said available bandwidth and setting an overload condition if said amount of available bandwidth exceeds said maximum virtual path threshold and clearing said overload condition if said virtual path amount of available bandwidth is below said maximum threshold;

(d) requesting a block of an additional bandwidth from said physical interface if said virtual path amount of available bandwidth exceeds said maximum virtual path threshold; and (e) searching for violations of terms and conditions of client contracts and taking measures to enforce client contracts if said block of additional bandwidth from said physical interface is not available.

27. The process of monitoring said utilization level of said virtual path on said physical interface of claim 26, further comprising:

(f) comparing said virtual path amount of available bandwidth to a minimum virtual path threshold condition and releasing a block of borrowed bandwidth to said physical interface if said virtual path amount of available bandwidth is below said minimum virtual path threshold condition.

28. The process of monitoring said utilization level of said virtual path on said physical interface of claim 26, further comprising:

(d) requesting a block of an additional bandwidth from said physical interface if said amount of available bandwidth exceeds said maximum virtual path threshold; and (e) updating total bandwidth allocation and available bandwidth if said block of said additional bandwidth from said physical interface is available.

29. A process of monitoring an utilization level of a virtual connection on a physical interface, said virtual connection on said physical interface comprising a plurality of groupings of virtual paths in which each grouping of virtual paths comprising a plurality of virtual paths, each grouping of virtual paths having a grouping utilization level and each virtual path having a path utilization level, comprising:

(a) monitoring said path utilization level of each virtual path in one grouping of virtual paths of said plurality of virtual paths to generate a path usage amount;

(b) combining said path usage amounts of each virtual path of said one grouping of virtual paths to monitor said grouping utilization level of said one grouping of virtual paths by:

(b1) checking said utilization level of said virtual path;

(b2) updating a virtual path amount of available bandwidth for said virtual path;

(b3) comparing said virtual path amount of available bandwidth with a maximum virtual path threshold for said available bandwidth and setting an overload condition if said amount of available bandwidth exceeds said maximum virtual path threshold and clearing said overload condition if said virtual path amount of available bandwidth is below said maximum virtual path threshold;

(b4) requesting a block of an additional bandwidth from said physical interface if said virtual path amount exceeds said maximum threshold; and (b5) searching for violations of terms and conditions of client contracts and taking measures to enforce client contracts if additional bandwidth from said physical interface is not available;

(c) requesting a block of an additional bandwidth from said physical interface if said amount of available bandwidth exceeds said maximum threshold; and (d) searching for violations of terms and conditions of client contracts and taking measures to enforce client contracts if said block of additional bandwidth from said physical interface is not available.

30. The process of monitoring said utilization level of said virtual connection on said physical interface of claim 29, further comprising:

(c) repeating steps (a) and (b) for each grouping of virtual paths in said plurality of grouping of virtual paths.

31. The process of monitoring said utilization level of said virtual connection on said physical interface of claim 29, wherein steps (a) and (b) are performed at periodic intervals.

32. The process of monitoring said utilization level of said virtual connection on said physical interface of claim 29, wherein step (a) further comprises:

(a1) checking said grouping utilization level of said one grouping of said virtual paths;

(a2) updating a grouping amount of available bandwidth for said one grouping of said virtual paths; and (a3) comparing said grouping amount of available bandwidth with a maximum grouping threshold for said available bandwidth and setting an overload condition if said grouping amount of available bandwidth exceeds said maximum grouping threshold and clearing said overload condition if said grouping amount of available bandwidth is below said maximum grouping threshold.

33. The process of monitoring said utilization level of said virtual connection on said physical interface of claim 32, wherein step (a) further comprises:

(a4) comparing said grouping amount of available bandwidth to a minimum grouping threshold condition and releasing a block of borrowed bandwidth to said physical interface if said grouping amount of available bandwidth is below said minimum grouping threshold condition.

34. The process of monitoring said utilization level of said virtual connection on said physical interface of claim 32, wherein step (a) further comprises:

(a4) requesting a block of an additional bandwidth from said physical interface if said grouping amount of available bandwidth exceeds said maximum grouping threshold; and (a5) updating total bandwidth allocation and available bandwidth if said block of said additional bandwidth from said physical interface is available.

35. The process of monitoring said utilization level of said virtual connection on said physical interface of claim 29, further comprising:

(b4) comparing said virtual path amount of available bandwidth to a minimum virtual path threshold condition and releasing a block of borrowed bandwidth to said physical interface if said amount is below said minimum virtual path threshold condition.

36. The process of monitoring said utilization level of said virtual connection on said physical interface of claim 29, further comprising:

(b4) requesting a block of additional bandwidth from said physical interface if said virtual path amount exceeds said maximum threshold; and (b5) updating total bandwidth allocation and available bandwidth if additional bandwidth from said physical interface is available.

37. A system, comprising:
(a) a first asynchronous transfer mode switch;
(b) a second asynchronous transfer mode switch that is interconnected with said first asynchronous transfer mode switch via a physical interface, said first asynchronous transfer mode switch transfer various types of information to said second asynchronous transfer mode switch via said a virtual connection on said physical interface; and
(c) a system control module in communication with said first asynchronous transfer mode switch, said system control module in communication with said second asynchronous transfer mode switch via said first asynchronous transfer mode switch and said physical interface, said system control module dynamically determines whether said virtual connection can be created, wherein said first asynchronous transfer mode switch has a first connection admission control module therein to determine whether said virtual connection can be connected through said first asynchronous transfer mode switch and said second asynchronous transfer mode switch has a second connection admission control module therein to determine whether said virtual connection can be connected through said second asynchronous transfer mode switch.

38. The system of claim 37, wherein said virtual connection is requested to occur at a specific time of day and is adapted to transfer a specific type of information and system control module considers said specific time of day and said specific type of information to determine whether to create said virtual connection.

39. The system of claim 37, wherein said system control module considers at least one factor to determine whether to make said virtual connection, said at least one factor is selected from a group consisting of terms and conditions of a network contract agreement covering said virtual connection, type of information that said virtual connection will transfer, quality of service expected of said virtual connection, existing traffic load of said network, utilization of said network, and date and time of day that said virtual connection will exist.

40. The system of claim 37, wherein said system control module on an on-going basis determines whether said physical link is in an overload condition and said system control module also checks said overload condition and determines whether said virtual connection can be set up for said network.

41. The system of claim 37, wherein said physical interface is selected from a group consisting of fiber optic, twisted pair, coax, and wireless.

42. The system of claim 37, wherein said various types of information includes information selected from a group consisting of constant bit rate information, voice information, video information, variable bit rate information, data information, connection-oriented information, frame-relay information, and connectionless information.

43. The system of claim 37, wherein said virtual connection is selected from a group consisting of virtual paths, virtual channels, groupings of virtual paths, and any combination of virtual paths and virtual channels.

44. A process of monitoring an utilization level of a virtual connection on a physical interface, said virtual connection on said physical interface comprising a plurality of groupings of virtual paths in which each grouping of virtual paths comprising a plurality of virtual paths, each grouping of virtual paths having a grouping utilization level and each virtual path having a path utilization level, comprising:

(a) monitoring said path utilization level of each virtual path in one grouping of virtual paths of said plurality of virtual paths to generate a path usage amount;
(b) combining said path usage amounts of each virtual path of said one grouping of virtual paths to monitor said grouping utilization level of said one grouping of virtual paths by:
(b1) checking said utilization level of each virtual path of said one grouping of virtual paths;
(b2) updating a virtual path amount of available bandwidth for each virtual path of said one grouping of virtual paths; and
(b3) comparing said virtual path amount of available bandwidth with a maximum virtual path threshold for said available bandwidth and setting an overload virtual path condition if said virtual path amount of available bandwidth exceeds said maximum virtual path threshold and clearing said overload condition if said virtual path amount of available bandwidth is below said maximum virtual path threshold;
(b4) requesting a block of an additional bandwidth from said physical interface if said virtual path amount of available bandwidth exceeds said maximum virtual path threshold; and
(b5) searching for violations of terms and conditions of client contracts and taking measures to enforce client contracts if said block of said additional bandwidth from said physical interface is not available.

45. The process of monitoring said utilization level of said virtual connection on said physical interface of claim 44, further comprising:
(c) repeating steps (a) and (b) for each grouping of virtual paths in said plurality of grouping of virtual paths.

46. The process of monitoring said utilization level of said virtual connection on said physical interface of claim 44, wherein steps (a) and (b) are performed at periodic intervals.

47. The process of monitoring said utilization level of said virtual connection on said physical interface of claim 44, wherein step (a) further comprises:
(a1) checking said grouping utilization level of said one grouping of said virtual paths;
(a2) updating a grouping amount of available bandwidth for said one grouping of said virtual paths; and
(a3) comparing said grouping amount of available bandwidth with a maximum grouping threshold for said available bandwidth and setting an overload grouping condition if said amount of available bandwidth exceeds said maximum grouping threshold and clearing said overload grouping condition if said amount of available bandwidth is below said maximum grouping threshold.

48. The process of monitoring said utilization level of said virtual connection on said physical interface of claim 47, wherein step (a) further comprises:
(a4) comparing said grouping amount to a minimum grouping threshold condition and releasing a block of borrowed bandwidth to said physical interface if said grouping amount of available bandwidth is below said minimum grouping threshold condition.

49. The process of monitoring said utilization level of said virtual connection on said physical interface of claim 47, wherein step (a) further comprises:
(a4) requesting a block of additional bandwidth from said physical interface if said grouping amount of available bandwidth exceeds said maximum grouping threshold; and (a5) updating total bandwidth allocation and available bandwidth if additional bandwidth from said physical interface is available.

50. The process of monitoring said utilization level of said virtual connection on said physical interface of claim 44, further comprising:

(b6) comparing said virtual path amount to a minimum virtual path threshold condition and releasing a block of borrowed bandwidth to said physical interface if said virtual path amount of available bandwidth is below said minimum virtual path threshold condition.

51. A system of monitoring use of a network, said network used to transfer information from a first location to a second location, comprising:

(a) a plurality of interconnected asynchronous transfer mode switches that are interconnected with one another via at least one physical interface to form said network and a virtual path group connecting one interconnected asynchronous transfer mode switch of said plurality of interconnected asynchronous transfer mode switches to at least one other interconnected asynchronous transfer mode switch of said plurality of interconnected asynchronous transfer mode switches via a first physical interface of said at least one physical interface, said virtual path group comprised of at least one virtual path, each virtual path is comprised of at least one virtual channel; and (b) a system control module connected to at least one interconnected asynchronous transfer mode switch of said plurality of interconnected asynchronous transfer mode switches, said system control module determines whether said virtual path group can be created in said network, said system control module determines whether said at least one virtual channel of each said virtual path can be created in said network, wherein a client is allowed to use said network under certain circumstances, and further wherein said system control module compares a request from said client to use said virtual path group with a contract with said client having terms and conditions governing said certain circumstances to determine whether said request of said client is compliant with said terms and conditions found in said contract and further wherein said virtual connection is comprised of at least one virtual path group and each virtual path group of said at least one virtual path group is comprised of at least one virtual path and further wherein each virtual path group has a first utilization level and each virtual path has a second utilization level and said system control module checks said second utilization level of each virtual path in one virtual path group and then said first utilization level of said virtual path group.

52. The system of claim 51, wherein a client is allowed to utilize said network under certain conditions, and further wherein said system control module compares a request from said client to use said virtual grouping with a contract having terms and conditions governing said virtual grouping to determine whether said request of said client is complaint with said terms and conditions found in said contract.

53. The system of claim 51, wherein if said request of said client is not compliant with said terms and conditions of said contract, said system control module determines whether said network is presently overloaded or not, and, if said network is not presently overloaded, said network utilizes unspecified virtual channels in said virtual path group to satisfy said request of said client.

54. The system of claim 51, wherein said terms and conditions define quality of service expectations and certain parameter restrictions.

55. The system of claim 54, further wherein if said system control module determines that said request from said client is not compliant with said quality of service expectations or said certain parameter restrictions, said system control module determines whether said network is presently overloaded or not, and, if said network is not presently overload, said network utilizes unspecified capacity in any one of said at least one virtual path groups to satisfy said request of said client.

56. The system of claim 51, wherein said network has a network utilization level and further wherein said system control module periodically and continuously checks said network utilization level to determine whether said network is overloaded and whether said virtual path group can be created and whether said at least one virtual channel of said virtual path can be created.

57. The system of claim 51, wherein each virtual path group has a third utilization level and each virtual path has a fourth utilization level and said system control module checks said fourth utilization level of each virtual path in one virtual path group and said third utilization level of said virtual path group to determine whether said at least one virtual channel of said virtual path can be created.

58. The system of claim 51, wherein system control module considers at least one factor to determine whether said virtual path grouping or said virtual channel can be formed, said at least one factor is selected from a group consisting of terms and conditions of a network contract agreement having terms and conditions covering a client's unspecified capacity on said physical interface, type of information that said virtual connection will transfer, quality of service expected of said virtual connection, existing traffic load of said network and utilization of said network.

59. The system of claim 51, further wherein said system control module communicates with each connection admission control module of each asynchronous transfer mode switch of said plurality of interconnected asynchronous transfer mode switches that will be connected to another asynchronous transfer mode switch of said plurality of interconnected asynchronous transfer mode switches by said virtual path group through said network to determine whether said virtual path group can be created and whether said at least one virtual channel of each virtual path can be created in said network.

60. The system of claim 51, wherein said physical interface has a corresponding interface utilization level and further wherein said system control module periodically and continuously checks said interface utilization level to determine whether said virtual connection should be created.

* * * * *